(12) United States Patent
Roller et al.

(10) Patent No.: US 8,530,567 B2
(45) Date of Patent: Sep. 10, 2013

(54) POLYMER DISPERSION WHICH COMPRISES A HIGHLY BRANCHED POLYCARBONATE HAVING UNSATURATED FATTY ACID GROUPS

(75) Inventors: Sebastian Roller, Mannheim (DE); Monika Haberecht, Ludwigshafen (DE); Bernd Bruchmann, Freinsheim (DE)

(73) Assignee: BASF SE, Ludwigshafen (DE)

(*) Notice: Subject to any disclaimer, the term of this patent is extended or adjusted under 35 U.S.C. 154(b) by 210 days.

(21) Appl. No.: 13/028,624

(22) Filed: Feb. 16, 2011

(65) Prior Publication Data

US 2011/0201745 A1 Aug. 18, 2011

Related U.S. Application Data

(60) Provisional application No. 61/305,554, filed on Feb. 18, 2010.

(51) Int. Cl.
*C09B 67/00* (2006.01)
*C08G 64/00* (2006.01)

(52) U.S. Cl.
USPC ........................................ 524/502; 528/370

(58) Field of Classification Search
USPC ....................................................... 524/502
See application file for complete search history.

(56) References Cited

U.S. PATENT DOCUMENTS

| | | |
|---|---|---|
| 2006/0052510 A1 | 3/2006 | Haggman et al. |
| 2007/0037957 A1 | 2/2007 | Bruchmann et al. |
| 2008/0167430 A1 | 7/2008 | Bruchmann et al. |
| 2009/0093589 A1 | 4/2009 | Bruchmann et al. |
| 2010/0035065 A1* | 2/2010 | Terrenoire et al. ............ 428/412 |
| 2010/0280165 A1 | 11/2010 | Terrenoire et al. |
| 2011/0015301 A1 | 1/2011 | Herth et al. |
| 2011/0015361 A1 | 1/2011 | Al-Hellani et al. |
| 2011/0021652 A1 | 1/2011 | Mohmeyer et al. |
| 2011/0021686 A1 | 1/2011 | Jain et al. |
| 2011/0021687 A1 | 1/2011 | Jain et al. |

FOREIGN PATENT DOCUMENTS

| | | |
|---|---|---|
| DE | 10 2006 054 237 A1 | 5/2008 |
| EP | 2 009 072 A1 | 12/2008 |
| WO | WO 03/062306 A1 | 7/2003 |
| WO | WO 2004/016700 A1 | 2/2004 |
| WO | WO 2004/016701 A1 | 2/2004 |
| WO | WO 2004/037928 A1 | 5/2004 |
| WO | WO 2005/003186 A1 | 1/2005 |
| WO | WO 2005/026234 A1 | 3/2005 |
| WO | WO 2006/089940 A1 | 8/2006 |
| WO | WO 2007/135032 A2 | 11/2007 |
| WO | WO 2008/071801 A1 | 6/2008 |
| WO | WO 2009/029479 A1 | 3/2009 |
| WO | WO 2009/065867 A1 | 5/2009 |
| WO | WO 2009/109622 A1 | 9/2009 |
| WO | WO 2010/076253 A1 | 7/2010 |

OTHER PUBLICATIONS

U.S. Appl. No. 13/497,834, filed Mar. 23, 2012, Schoenfelder, et al.
U.S. Appl. No. 12/952,646, filed Nov. 26, 2009, Bruchmann, et al.
U.S. Appl. No. 12/952,711, filed Nov. 26, 2009, Bruchmann, et al.
U.S. Appl. No. 12/966,528, filed Dec. 13, 2010, Roller, et al.
U.S. Appl. No. 13/006,819, filed Jan. 14, 2011, Schoenfelder, et al.
U.S. Appl. No. 13/021,190, filed Feb. 4, 2011, Bruchmann, et al.
U.S. Appl. No. 13/084,753, filed Apr. 12, 2011, Bruchmann, et al.
International Search Report issued on Apr. 29, 2011 in corresponding International Application No. PCT/EP2011/052324 filed on Feb. 17, 2011 (with an English Translation of Category of Cited Documents).

* cited by examiner

*Primary Examiner* — Hui Chin

(74) *Attorney, Agent, or Firm* — Oblon, Spivak, McClelland, Maier & Neustadt, L.L.P.

(57) ABSTRACT

The present invention relates to a polymer dispersion which comprises a highly branched polycarbonate having unsaturated fatty acid groups. The invention further relates to highly branched polycarbonates having groups deriving from unsaturated fatty acids, to a process for preparing such highly branched polycarbonates, and to the use of these highly branched polycarbonates for improving the curing properties of coating compositions based on an aqueous acrylate dispersion.

17 Claims, No Drawings

POLYMER DISPERSION WHICH COMPRISES A HIGHLY BRANCHED POLYCARBONATE HAVING UNSATURATED FATTY ACID GROUPS

CROSS-REFERENCE TO RELATED APPLICATIONS

This application is based upon and claims the benefit of priority to U.S. provisional application No. 61/305,554 filed on Feb. 18, 2010.

BACKGROUND OF THE INVENTION

The present invention relates to a polymer dispersion which comprises a highly branched polycarbonate having unsaturated fatty acid groups. The invention further relates to highly branched polycarbonates having groups deriving from unsaturated fatty acids, to a process for preparing such highly branched polycarbonates, and to the use of these highly branched polycarbonates for improving the curing properties of coating compositions based on an aqueous acrylate dispersion.

A key quality of a coating composition, such as of a coating material, for example, is the development of hardness after application, a quality which describes how the hardness of the film is built up and the tack decreased until the ultimate hardness is attained. There is also a need for coating compositions featuring enhanced curing properties. These properties may be manifested, for example, in a reduction in cure time, good curing properties with reduced fraction of organic solvents, or a higher ultimate hardness. At the same time, other important performance properties, such as gloss, chemical resistance, etc., are not to be impaired, as far as is possible.

Alkyd resins are polyester resins which incorporate polybasic acids, polyhydric alcohols (polyols), and monocarboxylic acids. They remain an important class of binder for the production of paints. Oxidatively crosslinking (oxidatively drying) alkyd resins comprise, in particular, polyunsaturated fatty acids. Film consolidation in such materials is accomplished through chemical crosslinking, involving atmospheric oxygen. The drying properties in this case may be influenced, for example, through the nature and amount of the monocarboxylic acids used at the preparation stage. Also possible is the use of catalysts that accelerate drying, referred to as dryers (siccatives). Traditional alkyd binders are commonly solvent-based, and their use is nowadays no longer attractive from the standpoint of VOC reduction. Synthetic resins which, in addition to the polycarboxylic acid, polyol, and monocarboxylic acid constituents, comprise further constituents, e.g., styrenes, acrylates, polyamides, urethanes, epoxides, silicones, are referred to as "modified alkyd resins".

Another important class of binder for the production of paints or coating materials for coating leather, paper, polymeric films, etc., are aqueous polymer dispersions, which form polymer films when the aqueous dispersion medium is evaporated. There has been no lack of attempts to improve these polymer dispersions by means of suitable adjuvants or with a view to particular fields of use, such as the optimization of hardness properties. Many times, however, these adjuvants have their own disadvantages, such as a certain volatility, for example, which then impacts adversely on the VOC level of the coatings obtained from them.

WO 2005/003186 describes a process for preparing aqueous polymer dispersions on the basis of copolymers which comprise in copolymerized form at least one hydrophobic allyl, vinyl, maleic or diene monomer, the polymerization taking place in the presence of at least one dendritic polymer.

WO 2005/026234 describes high-functionality highly branched or hyperbranched polycarbonates and also their preparation and use for producing printing inks.

WO 2006/089940 describes high-functionality highly branched or hyperbranched polycarbonates, a process for preparing them, and their use in the production of paint systems.

WO 2007/135032 describes the use of hyperbranched polycarbonates as dispersants for pigments.

WO 2008/071801 describes polymer dispersions which comprise highly branched polycarbonates.

WO 2009/065867 describes the use of highly branched polymers for preparing polymer dispersions having improved freeze/thaw stability. The highly branched polymers can be polycarbonates.

WO 2009/065867 describes the use of highly branched polymers for preparing polymer dispersions for high-gloss paints. The highly branched polymers, again, can be polycarbonates.

WO 2009/109622 describes polyurethane dispersions which comprise at least one highly branched polymer. The highly branched polymers may, again, be polycarbonates.

The polycarbonates described in the documents identified above do not contain unsaturated groups suitable for a crosslinking reaction.

WO 2004/016700 describes a water-based aqueous copolymer dispersion which is obtainable by copolymerization of at least one dendritic polymer, functionalized with alkylene groups, onto a polymer backbone of unsaturated monomers. The resultant copolymer dispersions are suitable as binders for coating materials and are notable for improved blocking resistance on the part of the corresponding coatings. Highly branched polycarbonates modified with alkenyl groups, and highly branched polycarbonates which are crosslinkable oxidatively, especially, are not described. Also not disclosed is the use of the dendritic polymers for enhancing the curing properties of aqueous polymer dispersions.

WO 2004/016701 contrasts with WO 2004/016700 in relating to homopolymer or copolymer dispersions which comprise a physical mixture of homopolymers or copolymers of unsaturated monomers and at least one dendritic polymer which is functionalized with alkylene groups.

WO 2003/062306 describes chain-extended dendritic polyethers. Among the groups these polyethers may contain are terminal groups deriving from unsaturated fatty acids. One possible field of use described is as pigment dispersants for water-based coating compositions.

EP 2 009 072 A1 describes an aqueous polymer composition which comprises an autooxidizable material and an emulsion polymer, the emulsion polymer comprising in copolymerized form an ethylenically unsaturated monomer having carbonyl groups. Such aqueous polymer compositions are suitable for producing coating compositions having improved recoatability in the course of drying.

WO 2004/037928 describes an air-drying aqueous resin composition composed of a fatty-acid-functionalized, hyperbranched polymer, which dries in air, a nonamphiphilic alkyd resin, a dryer, and a stabilizer. This document as well does not describe oxidatively crosslinkable, alkenyl-modified, highly branched polycarbonates. Also not disclosed is the use of the fatty-acid-functionalized, hyperbranched polymers for enhancing the curing properties of aqueous polymer dispersions.

WO 2009/029479 describes dendritic polymers which act as oxygen scavengers in packaging materials. The dendritic polymers in the sense of this document may be polymers which in structural terms are very different but are in some way branched. Encompassed are, for example, not only dendrimers in the actual sense (i.e., having an ideal degree of branching of 100%), but also branched graft copolymers. The polymers are additionally selected from a large number of different polymer classes, with polycarbonates being mentioned only as a possible, but not preferred, embodiment. Preferred according to the teaching of this document is the use of dendritic polyesters, and specifically of BOLTORN® U3000 and W3000 from Perstorp. The oxygen-scavenging groups may be, very generally, organic groups having at least one C—C double bond. These groups in turn are selected from a large number of different groups, with groups derived from unsaturated fatty acids being mentioned as one possible embodiment. The working examples describe coextrudates of PET pellets and of BOLTORN U3000 or of BOLTORN W3000 modified with linolenic acid. From these coextrudates, blow molding is used to produce plastic bottles which are said to have a lower oxygen permeability than conventional PET bottles. Aqueous polymer dispersions and coating compositions based thereon, comprising at least one highly branched polycarbonate with unsaturated fatty acid groups, are not described in WO 2009/029479. Moreover, it has emerged that highly branched simple polyesters with unsaturated fatty acid groups, and especially BOLTORN U3000 (a dendritic polyester modified with unsaturated fatty acid groups), are much more poorly suited to improving the development of hardness of polymer dispersions than are the highly branched polycarbonates with unsaturated fatty acid groups that are used in accordance with the invention.

It is an object of the present invention to provide new additives for coating compositions, more particularly for aqueous polymer dispersions. They are to have enhanced performance properties and, in particular, enhanced development of hardness and/or a higher ultimate hardness.

Surprisingly it has been found that this object is achieved through the use of highly branched polycarbonates having long, singly or multiply unsaturated hydrocarbon chains.

The invention accordingly provides an aqueous polymer dispersion Pd) comprising:
an emulsion polymer of at least one α,β-ethylenically unsaturated monomer M), and
at least one highly branched polycarbonate which comprises at least one $C_8$ to $C_{32}$ alkenyl radical having at least one carbon-carbon double bond.

Additionally provided by the invention is a coating material comprising
an aqueous polymer dispersion Pd) as defined above and in the text below,
optionally at least one pigment,
optionally at least one filler,
optionally further auxiliaries, and
water.

Specific embodiments are coating materials in the form of a clear vanish, and coating materials in the form of an emulsion paint.

The invention further provides a highly branched polycarbonate which comprises at least one $C_8$ to $C_{32}$ alkenyl radical having at least one carbon-carbon double bond.

One specific embodiment of the highly branched polycarbonates of the invention and used according to the invention are oxidatively crosslinking highly branched polycarbonates. As in the case of oxidatively crosslinking alkyd resins the alkenyl radicals of the oxidatively crosslinking highly branched polycarbonates derive at least in part from fatty acids having two or more (e.g., 3, 4 or 5) carbon-carbon double bonds. In other words, the oxidatively crosslinking alkyd resins contain alkenyl radicals which are obtained, formally, from the corresponding doubly or multiply unsaturated $C_8$ to $C_{32}$ carboxylic acid by removal of the carboxyl group.

The highly branched polycarbonates of the invention and used according to the invention preferably contain at least one $C_8$ to $C_{32}$ alkenyl radical which comprises exclusively nonactivated carbon-carbon double bonds. By nonactivated carbon-carbon double bonds are meant, in the context of the invention, those for which the carbon atoms in the double bond are not attached directly to an oxygen atom in ether linkage and not directly to a —C(=O)— group (carbonyl or carboxyl group).

The highly branched polycarbonates of the invention and used according to the invention preferably contain at least one $C_8$ to $C_{32}$ alkenyl radical which comprises at least two isolated (nonconjugated) carbon-carbon double bonds.

The highly branched polycarbonates of the invention and used according to the invention may further contain at least one $C_8$ to $C_{32}$ alkenyl radical which comprises at least two conjugated carbon-carbon double bonds. These lead in general to an acceleration of oxidative crosslinking, and are suitable for modifying the crosslinking behavior.

The highly branched polycarbonates of the invention and used according to the invention may further contain at least one $C_8$ to $C_{32}$ alkyl radical (i.e., a saturated $C_8$ to $C_{32}$ hydrocarbon radical).

The invention further provides a process for preparing a highly branched polycarbonate which comprises at least one $C_8$ to $C_{32}$ alkenyl radical having at least one carbon-carbon double bond, by reacting at least one organic carbonate (A) with at least one at least trifunctional alcohol (B) and at least one compound (C), the compound (C) having
a $C_8$ to $C_{32}$ alkenyl radical having at least one carbon-carbon double bond, and
a functional group that is reactive toward hydroxyl groups or carbonate groups.

Preference is given to a process for preparing a highly branched polycarbonate which comprises at least one $C_8$ to $C_{32}$ alkenyl radical having at least one carbon-carbon double bond, involving
a) reacting at least one organic carbonate (A) with at least one at least trifunctional alcohol (B), with elimination of alcohols to give a condensation product (K),
b) reacting the condensation product (K) further, with elimination of alcohols to give a highly branched polycarbonate (P), at least part of the eliminated alcohols being removed from the reaction mixture,
with the additional use, for the reaction in step b), of at least one compound (C) which has a $C_8$ to $C_{32}$ alkenyl radical having at least one carbon-carbon double bond, and a functional group that is reactive toward hydroxyl groups or carbonate groups, and/or reacting the highly branched polycarbonate (P), subsequent to step b), with at least one compound (C).

The invention further provides the highly branched polycarbonates obtainable by the process described above and in the text below.

The invention further provides a process for preparing an aqueous polymer dispersion Pd) by free-radical emulsion polymerization of at least one monomer M), which involves adding at least one highly branched polycarbonate before and/or during and/or after the emulsion polymerization, as described above and in the text below.

Addition after the emulsion polymerization in this case also includes addition in the context of the formulation of a product which comprises an emulsion polymer based on at least one α,β-ethylenically unsaturated monomer M). For this purpose, at least one highly branched polycarbonate as defined above and in the text below may be added as an additive to, for example, a coating material or a paper coating slip.

The invention further provides for the use of at least one highly branched polycarbonate as defined above and in the text below as an additive for a coating composition comprising an emulsion polymer based on at least one ethylenically unsaturated monomer, for improving the development of hardness in the coatings produced therefrom.

The invention further provides for the use of at least one highly branched polycarbonate as defined above and in the text below as an additive for a coating composition comprising an emulsion polymer based on at least one ethylenically unsaturated monomer, for enhancing the ultimate hardness of the coatings produced therefrom.

The use of the highly branched polycarbonates of the invention is accompanied by at least one of the following advantages:
  improvement in development of hardness in coatings based on aqueous polymer dispersions with addition of the highly branched polycarbonates,
  enhancement of ultimate hardness in coatings based on aqueous polymer dispersions with addition of the highly branched polycarbonates,
  high compatibility of the highly branched polycarbonates employed with a multiplicity of dispersions,
  and additionally:
  possibility of reducing the viscosity relative to aqueous polymer dispersions without addition of highly branched polycarbonates,
  possibility of preparing aqueous polymer dispersions with increased solids content relative to dispersions prepared without addition of highly branched polycarbonates,
  possibility of controlling the glass transition temperature, Tg, of the emulsion polymers present in the aqueous polymer dispersions Pd), on addition before and/or during the emulsion polymerization,
  possibility of reducing the minimum film formation temperature MFFT, more particularly on addition after the emulsion polymerization,
  at least partial avoidance of additives that increase the VOC content of the dispersions.

A suitable measurement value for the development of hardness in a coating, and for the ultimate hardness obtained, is the Konig pendulum hardness, determined in accordance with DIN 53157. Through repeated measurement of the pendulum hardness in the course of curing, such as, for example, within a period of one hour after application of the coating up to 28 days after application of the coating, the development of hardness can be monitored and the curing behavior of different coatings compared. Another suitable measurement value for the development of hardness in a coating and for the ultimate hardness obtained is the pencil hardness. Also suitable is dynamic mechanical thermo-analysis (DMTA). For that analysis a sample of material is subjected to a sinusoidal oscillating force, and a measurement is made of the deformation of the material. Determinations are made of both the amplitude and the phase shift of the deformation in respect of the force applied. From the measurement values it is possible to determine the viscoelastic properties of a sample as a function of time and temperature. As well as the glass transition temperature Tg, these properties are the elasticity modulus E and the shear modulus G of the material.

The remarks below relating to "highly branched polymers" apply, unless otherwise indicated, not only to the highly branched polycarbonates of the invention and used according to the invention which comprise at least one $C_8$ to $C_{32}$ alkenyl radical having at least one carbon-carbon double bond, but also to highly branched polycarbonate intermediates which must still be subjected to a reaction in order to introduce at least one $C_8$ to $C_{32}$ alkenyl radical having at least one carbon-carbon double bond.

The expression "highly branched polymers" refers for the purposes of this invention, quite generally, to polymers which are distinguished by a strongly branched structure and a high functionality. For the general definition of highly branched polymers, reference is also made to P. J. Flory, J. Am. Chem. Soc. 1952, 74, 2718, and H. Frey et al., Chem. Eur. J. 2000, 6, No. 14, 2499 (where they are referred to, in deviation from the definition chosen here, as "hyperbranched polymers").

The highly branched polymers in the sense of the invention include star polymers, dendrimers, arborols, and highly branched polymers different therefrom, such as hyperbranched polymers.

Star polymers are polymers in which three or more chains extend from a center. This center may be a single atom or a group of atoms.

Dendrimers derive structurally from the star polymers, but with star branching in each of the individual chains. Dendrimers are formed starting from small molecules by means of a continually repeating reaction sequence resulting in ever higher numbers of branches, at whose ends there are in each case functional groups which, in turn, are a starting point for further branches. Hence the number of monomer end groups grows exponentially with each reaction step, ultimately resulting in a tree structure which in the ideal case is spherical. A characteristic feature of the dendrimers is the number of reaction stages (generations) carried out for the purpose of their synthesis. On the basis of their uniform construction (in the ideal case, all of the branches comprise exactly the same number of monomer units), dendrimers are substantially monodisperse, i.e., they generally have a defined molar mass.

Both molecularly and structurally uniform highly branched polymers will also be referred to in common below as dendrimers.

"Hyperbranched polymers" in the context of this invention are highly branched polymers which, in contradistinction to the abovementioned dendrimers, are both molecularly and structurally nonuniform. They have side chains and/or side branches which differ in length and branching, and also a molar mass distribution (polydispersity).

Highly branched polymers preferably have a degree of branching (DB) per molecule of 10% to 100%, more preferably 10% to 90%, and more particularly 10% to 80%. This degree of branching, DB, is defined as $$DB(\%) = (T+Z)/(T+Z+L) \times 100, \text{ where}$$

T is the average number of terminally attached monomer units,
Z is the average number of branch-forming monomer units,
L is the average number of linearly attached monomer units.

Dendrimers generally have a degree of branching DB of at least 99%, especially 99.9% to 100%.

Hyperbranched polymers preferably have a degree of branching DB of 10% to 95%, more preferably 25% to 90%, and more particularly 30% to 80%.

In order to achieve advantageous performance properties it is possible to use not only the structurally and molecularly uniform dendrimers but also hyperbranched polymers.

Hyperbranched polymers, however, are generally easier and hence more economic to prepare than dendrimers. Thus, for example, the preparation of the monodisperse dendrimers is complicated by the fact that, at each linking step, protective groups have to be introduced and removed again, and, before the beginning of each new growth stage, intense cleaning operations are needed, which is why dendrimers can typically be prepared only on a laboratory scale.

The highly branched polycarbonates of the invention, and those used in accordance with the invention, are preferably hyperbranched polycarbonates.

The term "polycarbonate" for the purposes of the invention also embraces compounds which as well as carbonate groups contain further functional groups, such as poly(estercarbonates), poly(ethercarbonates), poly(etherestercarbonates), etc. However, the presence of the carbonate group (—O—(C═O)—O— group) is essential to the invention.

The highly branched polycarbonates of the invention and used according to the invention which comprise at least one $C_8$ to $C_{32}$ alkenyl radical having at least one carbon-carbon double bond preferably have a weight-average molecular weight $M_w$ in the range from about 500 to 100 000 g/mol, preferably 750 to 75 000 g/mol, more particularly 1000 to 50 000 g/mol. The molar mass can be determined by gel permeation chromatography with a standard, such as polymethyl methacrylate.

The addition of the highly branched polycarbonate may take place before and/or during and/or after the free-radical emulsion polymerization for the preparation of Pd). Specific embodiments, including those relating to the deliberate influencing of certain performance properties, are described below.

In the context of the present invention the expression "alkyl" encompasses straight-chain and branched alkyl groups. Suitable short-chain alkyl groups are, for example, straight-chain or branched $C_1$-$C_7$ alkyl, preferably $C_1$-$C_6$ alkyl, and more preferably $C_1$-$C_4$ alkyl groups. They include more particularly methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc.

Suitable longer-chain $C_8$-$C_{32}$ alkyl groups are straight-chain and branched alkyl groups. They are preferably predominantly linear alkyl radicals, of the kind also occurring in natural or synthetic fatty acids and fatty alcohols and also oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, etc. The expression "alkyl" encompasses unsubstituted and substituted alkyl radicals.

The above remarks for alkyl also apply to the alkyl moieties in arylalkyl. Preferred arylalkyl radicals are benzyl and phenylethyl.

$C_8$-$C_{32}$ alkenyl in the context of the present invention stands for straight-chain and branched alkenyl groups, which may be singly, doubly or multiply unsaturated. Preference is given to $C_{10}$-$C_{20}$ alkenyl. The expression "alkenyl" encompasses unsubstituted and substituted alkenyl radicals. The radicals in question are, especially, predominantly linear alkenyl radicals, of the kind which also occur in natural or synthetic fatty acids and fatty alcohols and also oxo-process alcohols. They include more particularly octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, eleostearyl, and oleyl (9-octadecenyl).

The expression "alkylene" in the sense of the present invention stands for straight-chain or branched alkanediyl groups having 1 to 7 carbon atoms, such as methylene, 1,2-ethylene, 1,3-propylene, etc.

Cycloalkyl stands preferably for $C_4$-$C_8$ cycloalkyl, such as cyclobutyl, cyclopentyl, cyclohexyl, cycloheptyl or cyclooctyl.

The expression "aryl" encompasses for the purposes of the present invention monocyclic or polycyclic aromatic hydrocarbon radicals which may be unsubstituted or substituted. The expression "aryl" stands preferably for phenyl, tolyl, xylyl, mesityl, furyl, naphthyl, fluorenyl, anthracenyl or phenanthrenyl, more preferably for phenyl or naphthyl, it being possible for these aryl groups, in the case of substitution, to carry generally 1, 2, 3, 4 or 5, preferably 1, 2 or 3, substituents.

Preparation of Highly Branched Polycarbonates with Alkenyl Radicals

For preparing the highly branched polycarbonates which comprise at least one $C_8$ to $C_{32}$ alkenyl radical having at least one carbon-carbon double bond, preference is given to a process in which at least one organic carbonate (A) is reacted with at least one at least trifunctional alcohol (B) and with at least one compound (C), the compound (C) having a $C_8$ to $C_{32}$ alkenyl radical having at least one carbon-carbon double bond, and a functional group which is reactive toward hydroxyl groups or carbonate groups.

The reaction with (C) may take place during and/or after the reaction of (A) with (B).

Component (A)

Preferred organic carbonates (A) have the general formula $R^aOC(═O)OR^b$, $R^a$ and $R^b$ each being selected independently of one another from straight-chain or branched alkyl, arylalkyl, cycloalkyl, and aryl radicals, and it also being possible for $R^a$ and $R^b$, together with the group —OC(═O)O— to which they are attached, to be a cyclic carbonate.

The radicals $R^a$ and $R^b$ may have identical or different definitions. In one specific version $R^a$ and $R^b$ have the same definitions. Preferably $R^a$ and $R^b$ are selected from $C_1$-$C_{20}$ alkyl, $C_5$-$C_7$ cycloalkyl, $C_6$-$C_{10}$ aryl, and $C_6$-$C_{10}$ aryl-$C_1$-$C_{20}$ alkyl, as defined above. $R^a$ and $R^b$ can also together be $C_2$-$C_6$ alkylene. With particular preference $R^a$ and $R^b$ are selected from straight-chain and branched $C_1$-$C_5$ alkyl, as defined above.

Dialkyl or diaryl carbonates (A) can be prepared, for example, from the reaction of aliphatic, araliphatic or aromatic alcohols, preferably monoalcohols, with phosgene. Furthermore, they can also be prepared via oxidative carbonylation of the alcohols or phenols by means of CO in the presence of noble metals, oxygen or $NO_x$. Regarding preparation methods for diaryl or dialkyl carbonates, see also Ullmann's Encyclopedia of Industrial Chemistry, 6th Edition, 2000 Electronic Release, Wiley-VCH.

Examples of suitable carbonates (A) encompass aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, and didodecyl carbonate.

Preference is given to using aliphatic carbonates (A), more particularly those in which the radicals comprise 1 to 5 C atoms, such as dimethyl carbonate, diethyl carbonate, dipropyl carbonate, dibutyl carbonate or diisobutyl carbonate, for example.

Component (B)

The organic carbonates are reacted with at least one aliphatic, cycloaliphatic or aromatic alcohol (B) which contains at least three OH groups, or with mixtures of two or more different alcohols (B).

Examples of alcohols having at least three OH groups are glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane), di(pentaerythritol), di-, tri- or oligoglycerols, or sugars, such as glucose, polyetherols that have a functionality of three or more and are based on alcohols with a functionality of three or more and ethylene oxide, propylene oxide or butylene oxide. Particular preference is given to glycerol, trimethylolethane, trimethylolpropane, 1,2,4-butanetriol, pentaerythritol, and also their polyetherols based on ethylene oxide or propylene oxide, having been reacted with 1 to 20 mol of alkylene oxide per mole of at least trifunctional alcohol.

For preparing the highly branched polycarbonates it is also possible, additionally, to use at least one alcohol B' different from the above-described alcohols (B) and from the alcohols (C) described below. The alcohols B' are selected from monofunctional alcohols, difunctional alcohols, and mixtures thereof. Suitable monofunctional alcohols comprise $C_4$-$C_{20}$ alkanols, such as n-butanol, sec-butanol, tert-butanol, cycloalkanols, such as cyclohexanol, aromatic alcohols, such as phenol, monofunctional polyetherols, and mixtures thereof. Suitable difunctional alcohols comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, difunctional polyetherols, and mixtures thereof.

The average OH functionality of all the alcohols B and, if present, B' used is preferably, together, more than 2.

Component (C)

The compounds (C) have a $C_8$ to $C_{32}$ alkenyl radical having at least one carbon-carbon double bond, and a functional group that is reactive toward hydroxyl groups or carbonate groups.

The functional groups that are reactive toward hydroxyl groups are preferably selected from carboxylic acid groups, carboxylic anhydrides, carbonyl halides, and carboxylic esters. Preferred halides are the chlorides. Preferred esters are the methyl esters, ethyl esters, mono-, di-, and triglycerides, and mixtures thereof.

The functional groups that are reactive toward carbonate groups are preferably selected from hydroxyl groups, thioalcohols, and primary and/or secondary amines.

Preferred compounds (C) are $C_8$ to $C_{32}$ monocarboxylic acids having at least one carbon-carbon double bond, or derivatives thereof. Suitable derivatives are anhydrides, halides, and esters. Preferred halides are the chlorides. Preferred esters are the methyl esters, ethyl esters, mono-, di-, and triglycerides, and mixtures thereof.

The monocarboxylic acids (C) may contain linear, branched, alicyclic or aromatic hydrocarbon radicals. Preference is given to linear (unbranched) monocarboxylic acids which comprise a $C_8$ to $C_{32}$ alkenyl radical having at least one carbon-carbon double bond. Preferred are $C_{10}$ to $C_{22}$ monocarboxylic acids.

Used with particular preference as compound (C) is at least one monocarboxylic acid which comprises at least one $C_8$ to $C_{32}$ alkenyl radical having at least two carbon-carbon double bonds.

In one specific embodiment, use is made as compound (C) of at least one monocarboxylic acid which comprises at least one $C_8$ to $C_{32}$ alkenyl radical having at least two isolated (nonconjugated) carbon-carbon double bonds.

With particular preference the double bonds in at least some of the $C_8$ to $C_{32}$ alkenyl radicals are located, relative to one another, in the 1,4-position or the 1,4,7-position. That is to say, the alkenyl radicals derive wholly or partly from fatty acids which have the double bonds, relative to one another, in the 1,4-position or 1,4,7-position. For the purposes of this specification, the terms 1,4-position and 1,4,7-position describe the relative position of the double bonds to one another. Counting is from the carboxyl group. The double bond carbon atom of the first double bond that is closest to the carboxyl group is numbered 1. It is followed by the double bond carbon atom of the second double bond that is closest to the carboxyl group, and, if present, the corresponding carbon atom of the third double bond. Alpha-linolenic acid ($C_{17}H_{29}$COOH) has the double bonds in the absolute positions 9, 12, and 15, and is therefore an example of a monocarboxylic acid having double bonds in the 1,4,7-position.

It is then possible, additionally, to use at least one other monocarboxylic acid (C) which comprises a $C_8$ to $C_{32}$ alkenyl radical having at least two conjugated carbon-carbon double bonds. Accordingly it is possible to obtain accelerated curing of the highly branched polycarbonates of the invention or of coating compositions which comprise at least one highly branched polycarbonate of the invention.

Preferred monocarboxylic acids (C) are naturally occurring fatty acids and fatty acid mixtures. In nature they are present as oils or fats in the form of triglycerides. For preparing the polycarbonates of the invention, they can be used in the form of the free fatty acid or of a derivative, especially in the form of a mono-, di- or triglyceride.

The monocarboxylic acid (C) is preferably selected from palmitoleic acid, oleic acid, linoleic acid, linolenic acid, eleostearic acid, fatty acids from linseed oil, fatty acids from soybean oil, fatty acids from cottonseed oil, fatty acids from sunflower oil, fatty acids from safflower oil, fatty acids from castor oil, fatty acids from fish oil, fatty acids from coconut fat, fatty acids from palm kernel oil, fatty acids from rapeseed oil, fatty acids from oiticica oil, fatty acids from tung oil (wood oil), fatty acids from ricinene oil, fatty acids from tall oil, fatty acids from poppy oil, fatty acids from nut oil, fatty acids from hemp oil, and derivatives and mixtures thereof. Suitable derivatives are anhydrides, halides, the mono-, di-, and—especially—triglycerides.

Preferred monocarboxylic acid derivatives (C) are linseed oil, soybean oil, cottonseed oil, sunflower oil, safflower oil, castor oil, fish oil, coconut fat, palm kernel oil, rapeseed oil, oiticica oil, tung oil (wood oil), ricinene oil, tall oil, poppy oil, nut oil, hemp oil, and mixtures thereof.

For preparing the polycarbonates of the invention, the monocarboxylic acids (C) or their anhydrides, halides or esters with monohydric alcohols are used preferably in an amount of 10 to 100 mol %, more preferably 30 to 100 mol %, more particularly 50 to 100 mol %, based on mole of OH groups in the hydroxyl-containing, highly branched starting polycarbonates (P).

For preparing the polycarbonates of the invention, the monocarboxylic diglycerides (C) are used preferably in an amount of 5 to 50 mol %, more preferably 15 to 50 mol %, more particularly 25 to 50 mol %, based on mole of OH groups in the hydroxyl-containing, highly branched starting polycarbonates (P).

For preparing the polycarbonates of the invention, the monocarboxylic triglycerides are used preferably in an amount of 3.4 to 33 mol %, more preferably 10 to 33 mol %, more particularly 16.7 to 33 mol %, based on mole of OH groups in the hydroxyl-containing, highly branched starting polycarbonates (P).

Other preferred compounds (C) are $C_8$ to $C_{32}$ monoalcohols having at least one carbon-carbon double bond. A particularly preferred compound (C) then used is at least one monoalcohol which comprises at least one $C_8$ to $C_{32}$ alkenyl radical having at least two carbon-carbon double bonds. In one specific embodiment the compound (C) used comprises at least one monoalcohol comprising at least one $C_8$ to $C_{32}$ alkenyl radical having at least two isolated (nonconjugated) carbon-carbon double bonds. With particular preference the double bonds in at least some of the $C_8$ to $C_{32}$ alkenyl radicals are located, relative to one another, in the 1,4-position or 1,4,7-position. It is then possible, additionally, to use at least one other monoalcohol (C) which comprises a $C_8$ to $C_{32}$ alkenyl radical having at least two conjugated carbon-carbon double bonds. In this way it is possible to achieve accelerated curing on the part of the highly branched polycarbonates of the invention or of coating compositions which comprise at least one highly branched polycarbonate of the invention.

Preferred monoalcohols (C) are those obtainable by reducing the carboxyl groups in naturally occurring fatty acids and fatty acid mixtures. In this respect, full reference is made to the fatty acids and fatty acid mixtures specified above for the monocarboxylic acids (C). Unsaturated fatty alcohols are widespread surfactants and available commercially. They are prepared, for example, from unsaturated fatty acid esters, especially the fatty acid methyl esters. These esters may be obtained from the triglycerides in a customary way, as for example by pressure cleavage in glycerol and fatty acids, and subsequent esterification with methanol. The resultant methyl esters can be selectively hydrogenated in the presence, for example, of mixed chromium or zinc catalysts (Ullmann's Encyclopedia of Industrial Chemistry, Verlag Chemie, Weinheim, 5th ed. on CD-ROM (1997), "Fatty Alcohols, 3. Unsaturated Fatty Alcohols"). Alternatively the carboxyl groups can be selectively reduced with sodium, as described by Bouveault and Blanc.

Unsaturated fatty alcohols preferred as component (C) are selected from palmoleyl alcohol, oleyl alcohol, elaidyl alcohol, petroselinyl alcohol, linolyl alcohol, linolenyl alcohol, ricinolyl alcohol, 12-hydroxystearyl alcohol, gadoleyl alcohol, erucyl alcohol, and mixtures thereof. In practice it is also possible, rather than the pure unsaturated fatty alcohols, to use technical mixtures with saturated homologs. These "predominantly unsaturated" fatty alcohols have an iodine number, for example, in the range from 50 to 150. In this context the term "predominantly unsaturated" should be understood to mean that at least 50 mol % of the fatty alcohol mixture is made up of unsaturated homologs. Also suitable is the use of fatty alcohol mixtures having an unsaturated fatty alcohol content of less than 50 mol %, such as in a range from 10 to 49.9 mol %, for example. The resulting systems are referred to as "semidrying systems".

Further preferred compounds (C) are $C_8$ to $C_{32}$ monoamines having at least one carbon-carbon double bond. A particularly preferred compound (C) then used is at least one monoamine comprising at least one $C_8$ to $C_{32}$ alkenyl radical having at least two carbon-carbon double bonds. One specific embodiment uses as compound (C) at least one monoamine which comprises at least one $C_8$ to $C_{32}$ alkenyl radical having at least two isolated (nonconjugated) carbon-carbon double bonds. With particular preference the double bonds in at least some of the $C_8$ to $C_{32}$ alkenyl radicals are located, relative to one another, in the 1,4-position or the 1,4,7-position. In that case it is possible additionally to use at least one further monoamine (C) which comprises a $C_8$ to $C_{32}$ alkenyl radical having at least two conjugated carbon-carbon double bonds. In that way it is possible to achieve accelerated curing on the part of the highly branched polycarbonates of the invention or of coating compositions which comprise at least one highly branched polycarbonate of the invention.

Preferred monoamines (C) are those obtainable from the corresponding naturally occurring fatty acids and fatty acid mixtures. Full reference in this respect is made to the fatty acids and fatty acid mixtures identified above in the context of the monocarboxylic acids (C). Unsaturated fatty amines are available commercially. They are prepared, for example, starting from unsaturated carbonitriles by reduction over a suitable catalyst. Carbonitriles are obtained from carboxylic acids and ammonia in the presence of hydrogenation catalysts. U.S. Pat. No. 4,234,509 describes a process for preparing fatty acid nitriles and glycerol from the corresponding triglycerides, especially from natural oils and fats. The selective reduction of the nitrile group in the unsaturated nitriles is achieved, for example, by the process described in U.S. Pat. No. 4,845,298, through reaction of hydrogen in the presence of a nickel catalyst and a carboxamide.

Unsaturated fatty amines preferred as component (C) are selected from palmoleylamine, oleylamine, elaidylamine, petroselinylamine, linolylamine, linolenylamine, ricinolylamine, 12-hydroxystearylamine, gadoleylamine, erucylamine, and mixtures thereof. In practice it is also possible to use technical mixtures with saturated homologs, rather than the pure unsaturated fatty amines.

A preferred process for preparing a highly branched polycarbonate which comprises at least one $C_8$ to $C_{32}$ alkenyl radical having at least one carbon-carbon double bond involves
  a) reacting at least one organic carbonate (A) with at least one at least trifunctional alcohol (B), with elimination of alcohols to give a condensation product (K),
  b) reacting the condensation product (K) further, with elimination of alcohols to give a highly branched polycarbonate (P), at least part of the eliminated alcohols being removed from the reaction mixture,
with the additional use, for the reaction in step b), of at least one compound (C) which has a $C_8$ to $C_{32}$ alkenyl radical having at least one carbon-carbon double bond, and a functional group that is reactive toward hydroxyl groups or carbonate groups, and/or reacting the highly branched polycarbonate (P), subsequent to step b), with at least one compound (C).

Steps a) and b) are carried out preferably as a one-pot synthesis, i.e., without isolation of the condensation product (K).

For the reaction in step b) it is possible to use, as well, other monofunctional and/or difunctional alcohols, which are different from the compounds B) and C) (and are identified using B').

The reaction of the carbonate (A) with at least one alcohol (B) and, if present, B' takes the form of a transesterification. With each condensation step in this reaction, an alcohol $R^a$—OH or $R^b$—OH is obtained which corresponds to the alkoxy radicals in the organic carbonates (A) of the formula $R^a OC(=O)OR^b$ that are used. If the alcohols liberated are to be removed by distillation, then it is advantageous to use carbonates (A) which in the course of the reaction liberate alcohols $R^a$—OH or $R^b$—OH having a boiling point of less than 140° C.

By the process described above, through reaction of the carbonate (A) with at least one alcohol (B) and, if present, B', highly branched polycarbonates (P) are formed which (without reaction with a compound (C)) contain carbonate groups and optionally at least one alcoholic hydroxyl group or hydroxyl groups, and optionally at least one organic carbonate group. Modifying the highly branched polycarbonates having $C_8$ to $C_{32}$ alkenyl radicals having at least one carbon-carbon double bond is accomplished by reaction of at least one compound (C).

In one specific version of the process of the invention, reaction of the carbonate (A) with at least one alcohol (B) and, if present, B' forms highly branched polycarbonates (P) which contain at least one alcoholic hydroxyl group. These compounds are then subjected to a further reaction of a compound (C) selected from $C_8$ to $C_{32}$ monocarboxylic acids having at least one carbon-carbon double bond, or a derivative thereof.

Suitable processes for preparing hydroxyl-containing, highly branched polycarbonates (P) are known in principle and are described, for example, in WO 2005/026234 and in WO 2006/089940, fully incorporated here by reference. These highly branched polycarbonates (P) contain at least one alcoholic hydroxyl group. The term "alcoholic hydroxyl group" here also encompasses OH groups attached to an aromatic moiety. The polycarbonates (P) obtainable in step b) contain preferably at least 4, more preferably at least 5, more particularly at least 6 alcoholic hydroxyl groups. The maximum number of hydroxyl groups is generally not critical. In many cases, however, it is not more than 200. The polycarbonates provided in step a) preferably have 4 to 100, especially 5 to 80, and more especially 6 to 50 alcoholic hydroxyl groups.

The hydroxyl-containing, highly branched polycarbonates (P) obtainable in step b) preferably have an OH number (determined in accordance with DIN 53240) of at least 20 mg KOH/g, more preferably of at least 50 mg KOH/g polymer, and very preferably at least 100 mg KOH/g polymer.

In addition to the alcoholic hydroxyl groups and the carbonate groups resulting from the synthesis, the hydroxyl-containing, highly branched polycarbonates (P) provided in step b) may contain further functional groups. In one specific embodiment the polycarbonates (P) provided in step b) contain at least 1, especially at least 2, more especially at least 4 further functional groups. The maximum number of these further functional groups is generally not critical. Generally speaking, however, it amounts to not more than 200, especially 1 to 100, more especially 2 to 80, and even more especially 6 to 50.

The further (optional) functional groups which may be carried by the hydroxyl-containing, highly branched starting polycarbonates provided in step b) are preferably selected, independently of one another, from —COON, —COOR$^x$, —CONH$_2$, —CONHR, —NH$_2$, —NHR or —SO$_3$H, with $R^x$=H, alkyl, cycloalkyl or aryl.

Steps a) and b)

The non-polymeric condensation products (K) obtained in step a) are preferably not isolated, and, in accordance with the invention, preferably undergo intermolecular reaction to form high-functionality polycondensation products (P), also called polycondensation products (P) below.

The reaction in step a) and in step b) may take place at the same or different temperatures. For example, the temperature in step b) may be higher than in step a), in order to obtain completion of the condensation reaction. A stepwise or successive temperature change is possible.

The reaction in step a) takes place preferably at a temperature in the range from 0 to 250° C., more preferably from 60 to 200° C.

The reaction in step b) takes place preferably at a temperature in the range from 0 to 250° C., more preferably from 60 to 200° C.

The reaction takes place preferably in bulk or in solution. This applies generally to step a) and step b). In these steps it is possible in general to use all solvents which are inert toward the respective reactants. Preference is given to using organic solvents, such as decane, dodecane, benzene, toluene, chlorobenzene, xylene, dimethylformamide, dimethylacetamide or solvent naphtha, for example.

In one preferred embodiment the condensation reaction is carried out in bulk. The aliphatic or aromatic alcohol liberated during the reaction ($R^a$—OH or $R^b$—OH) may be removed from the reaction mixture by distillation in order to accelerate the reaction. The distillative removal of the alcohol in step b) is preferred. Distillation may take place optionally under reduced pressure.

The reaction in step b) takes place preferably in a pressure range from 0.1 mbar to 20 bar, more preferably from 1 mbar to 5 bar.

The reactions in steps a) and b) and subsequent to step b) may be carried out in reactors or reactor cascades that are customary for such purposes. The reactions may be operated in batch mode, semibatchwise, or continuously.

To accelerate the reaction it is also possible to add catalysts or catalyst mixtures. Suitable catalysts are compounds which catalyze esterification or transesterification reactions, examples being alkali metal hydroxides, alkali metal carbonates, alkali metal hydrogen carbonates, preferably of sodium, of potassium or of cesium, tertiary amines, guanidines, ammonium compounds, phosphonium compounds, organoaluminum, organotin, organozinc, organotitanium, organozirconium or organobismuth compounds, and also catalysts of the kind known as double metal cyanide (DMC) catalysts, as described, for example, in WO 03/029240, WO 03/029325, and WO 03/014186.

Preferred catalysts used are potassium hydroxide, potassium carbonate, potassium hydrogen carbonate, titanium tetrabutoxide, titanium tetraisopropoxide, dibutyltin oxide, dibutyltin dilaurate, tin dioctoate, zirconium acetylacetonate, or mixtures thereof.

The catalyst is generally added in an amount of 50 to 10 000 ppm by weight, preferably of 100 to 5000 ppm by weight, based on the amount of alcohol or alcohol mixture employed.

The catalysts used in steps a) and b) and subsequent to step b) may be the same or different.

It is possible to control the intermolecular polycondensation reaction both by adding the appropriate catalyst and by selecting an appropriate temperature.

It is additionally possible, via the composition of the starting components and via the reaction time and/or reaction conversion, to adjust the average molecular weight of the polymer (P). To determine the actual conversion, for example, the alcohol formed may be removed continuously from the reaction mixture by distillation, and a measurement taken of the amount of alcohol removed. The reaction in step b) is preferably terminated after 20% to 90%, preferably 30% to 80%, of the amount of alcohol obtained in the case of full conversion has been removed from the reaction mixture.

For the termination of the intermolecular polycondensation reaction there are a variety of options. For example, the temperature can be lowered to a range in which the reaction comes to a standstill and the product (K) or the highly branched starting polycarbonate is stable on storage. As described above, the hydroxyl-containing, highly branched starting polycarbonate provided in this way can if desired be isolated prior to further reaction subsequent to step b), and subjected to working up and/or purification. The reaction mixture obtained after the reaction has been terminated is preferably used, without isolation, for further reaction subsequent to step b). The steps a), b), and subsequent to step b) are then carried out preferably as a one-pot reaction. For that purpose, at least one $C_8$ to $C_{32}$ monocarboxylic acid having at least one carbon-carbon double bond is added to the cooled reaction mixture, and further reaction is carried out.

The condensation products (K) or highly branched polycarbonates (P) prepared at elevated temperature are typically stable for a longer period of time at room temperature. The hydroxyl-containing, highly branched polycarbonates (P) provided by the process described above (step b)) may therefore be isolated if desired prior to subsequent, further reaction, and subjected to working up and/or to purification by customary methods known to the skilled worker. Generally speaking, the hydroxyl-containing, highly branched polycarbonates (P) present in the reaction mixture from the reaction between carbonate (A) and alcohol (B) (and optionally further components) may be used, without isolation, for further reaction for the introduction of the alkenyl radicals. The steps a), b), and subsequent to step b) may be carried out, according to one preferred embodiment, as a one-pot reaction.

In view of the nature of the condensation products (K) it is possible for the condensation reaction to result in polycondensation products (P) (i.e., hydroxyl-containing, highly branched polycarbonates) having different structures, with branches but no crosslinks. The number of hydroxyl groups in the polycondensation products (P) is a function of the nature of the condensation products (K) employed, and of the degree of polycondensation.

The polycarbonates of the invention may be prepared in step b) by conventional esterification. Suitable methods are described comprehensively, for example, in Ullmann's Enzyklopädie der technischen Chemie, Verlag Chemie Weinheim, 4th edition (1980), volume 19, pages 61 ff., or in H. Wagner and H. F. Sarx, "Lackkunstharze", Carl Hanser Verlag, Munich (1971), pages 86-152.

The reaction in step b) takes place preferably in the presence of an inert gas, e.g., nitrogen, helium or argon.

The reaction subsequent to step b) may take place optionally in the presence of a catalytic amount of a customary esterification catalyst. These include, for example, acids, bases, salts thereof or transition metal compounds. Suitable esterification catalysts are those mentioned above, which are fully incorporated here by reference. Suitable esterification catalysts also include phosphorus(I) compounds, such as phosphinic acid (hypophosphorous acid) or salts of phosphorus(I) acid (phosphinates, hypophosphites). Additionally suitable as esterification catalysts are titanates, preferably tetraalkyl orthotitanates, more particularly tetraisopropyl titanate and tetrabutyl titanate.

The amount of catalyst for the reaction subsequent to step b) is generally 50 to 10 000 ppm by weight, preferably from 100 to 5000 ppm by weight, based on the total amount of the polycarbonate used and the monocarboxylic acid.

The reaction subsequent to step b) takes place preferably at a temperature in the range from about 100 to 300° C., more preferably in the range from 120 to 260° C.

The reaction subsequent to step b) may also take place with continuous or stepwise increase in temperature.

The low molecular mass condensation product (water or, in the case of transesterification, alcohol) formed during the reaction subsequent to step b) is preferably removed continuously from the reaction mixture. Removal of the low molecular mass condensation product is preferably accomplished by distillation. In addition an azeotrope former, such as toluene or xylene, can be used.

Controlling the hydroxyl number and the acid number of the polycarbonates of the invention can be done via the nature of the reactants used (especially their hydroxyl and carboxylic acid equivalents), via the stoichiometry of the reactants used and/or via the esterification reaction time. Hence, in general, the polycondensation is carried out under analytical monitoring until the target hydroxyl and acid number values are attained. The molecular weight of the polycarbonates of the invention can be determined by analysis, by means of GPC, for example.

The invention also provides the polycarbonates obtainable by the process described above.

The highly branched polycarbonates of the invention and used according to the invention preferably have a number-average molecular weight Mn in the range from 700 to 50 000 g/mol.

The highly branched polycarbonates of the invention and used according to the invention preferably have a weight-average molecular weight Mw in the range from 1000 to 100 000 g/mol.

The highly branched polycarbonates of the invention and used according to the invention preferably have an acid number (determined in accordance with DIN 53402, ISO 2114) in the range from 0 to 100 mg KOH/g polymer, more preferably from 0 to 50 mg KOH/g polymer.

The highly branched polycarbonates of the invention and used according to the invention preferably have an OH number (determined in accordance with DIN 53240) in the region of at least 20 mg KOH/g polymer, preferably at least 50 and more preferably at least 100 mg KOH/g polymer.

In one further embodiment the highly branched polycarbonates of the invention and used according to the invention may comprise functional groups in addition to those already obtained as a result of the reaction. This functionalization may take place in step b), during a reaction subsequent to step b), with a component (C), or subsequent thereto.

If, before or during step b), components are added which besides hydroxyl or carbonate groups possess further functional groups or functional elements, then a polycarbonate polymer is obtained which has randomly distributed functionalities different from the carbonate or hydroxyl groups.

Effects of this kind can be achieved for example by adding, during the polycondensation, compounds which in addition to hydroxyl or carbonate groups carry further functional groups or functional elements, such as mercapto groups, primary, secondary or tertiary amino groups, ether groups, carboxylic acid derivatives, sulfonic acid derivatives, phosphonic acid derivatives, aryl radicals or long-chain alkyl radicals. For modification by means of carbamate groups it is possible for example to use ethanolamine, propanolamine, isopropanolamine, 2-(butylamino)ethanol, 2-(cyclohexylamino) ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

For modification with mercapto groups it is possible to use mercaptoethanol or thioglycerol, for example. Tertiary amino groups can be generated, for example, by incorporation of N-methyldiethanolamine, N-methyldipropanolamine or N,N-dimethylethanolamine. Ether groups can be generated, for example, by incorporating polyetherols having a functionality of two or more during condensation. Reaction with long-chain alkanediols enables long-chain alkyl radicals to be incorporated; reaction with alkyl or aryl diisocyanates generates polycarbonates containing alkyl, aryl, and urethane groups.

Subsequent functionalization can be obtained by reacting the highly branched polycarbonate, obtained in step b) or subsequent to step b), with a suitable functionalizing reagent, which is able to react with the OH and/or carbonate groups of the polycarbonate. This, however, is always subject to the proviso that the highly branched polycarbonates of the invention comprise at least one $C_8$ to $C_{32}$ alkenyl radical having at least one carbon-carbon double bond, as defined above.

The hydroxyl groups can be modified, for example, by addition of molecules containing acid groups or isocyanate groups (and different from the $C_8$ to $C_{32}$ monocarboxylic acid with at least one carbon-carbon double bond or derivatives thereof that is used in step b)). For example, polycarbonates containing acid groups can be obtained by reaction with cyclic anhydrides.

Additionally, high-functionality polycarbonates comprising hydroxyl groups can also be converted into high-functionality polycarbonate-polyetherpolyols by reaction with alkylene oxides-ethylene oxide, propylene oxide or butylene oxide, for example.

Polymer Dispersion Pd)

The invention provides, as stated above, an aqueous polymer dispersion Pd), which comprises an emulsion polymer of at least one α,β-ethylenically unsaturated monomer M) and at least one highly branched polycarbonate which comprises at least one $C_8$ to $C_{32}$ alkenyl radical having at least one carbon-carbon double bond. For suitable and preferred highly branched polycarbonates, reference is made in full to the observations above.

The aqueous polymer dispersion Pd) preferably comprises at least one highly branched polycarbonate of the invention in an amount of 0.1% to 30%, more preferably of 0.5% to 20%, more particularly of 1.0% to 10%, by weight, based on the total solids content of the aqueous polymer dispersion Pd) (i.e., x % of highly branched polycarbonate of the invention to y % of nonvolatile fractions of the polymer dispersion Pd), where x+y=100).

The polymer dispersion Pd) is prepared using at least one α,β-ethylenically unsaturated monomer M) which is preferably selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether(meth)acrylates, monomers containing urea groups, and mixtures thereof.

Suitable esters of α,β-ethylenically unsaturated monocarboxylic and dicarboxylic acids with $C_1$-$C_{20}$ alkanols are methyl(meth)acrylate, methyl ethacrylate, ethyl(meth)acrylate, ethyl ethacrylate, n-propyl(meth)acrylate, isopropyl (meth)acrylate, n-butyl(meth)acrylate, sec-butyl(meth)acrylate, tert-butyl(meth)acrylate, tert-butyl ethacrylate, n-hexyl (meth)acrylate, n-heptyl(meth)acrylate, n-octyl(meth) acrylate, 1,1,3,3-tetramethylbutyl(meth)acrylate, ethylhexyl (meth)acrylate, n-nonyl(meth)acrylate, n-decyl(meth) acrylate, n-undecyl(meth)acrylate, tridecyl(meth)acrylate, myristyl(meth)acrylate, pentadecyl(meth)acrylate, palmityl (meth)acrylate, heptadecyl(meth)acrylate, nonadecyl(meth) acrylate, arachidyl(meth)acrylate, behenyl(meth)acrylate, lignoceryl(meth)acrylate, cerotinyl(meth)acrylate, melissinyl(meth)acrylate, palmitoleyl(meth)acrylate, oleyl(meth) acrylate, linolyl(meth)acrylate, linolenyl(meth)acrylate, stearyl(meth)acrylate, lauryl(meth)acrylate, and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, Versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable ethylenically unsaturated carboxylic acids and sulfonic acids or their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acid, and 2-acrylamido-2-methylpropanesulfonic acid. Preference is given to, for example, styrenesulfonic acids such as styrene-4-sulfonic acid and styrene-3-sulfonic acid and the alkali metal or alkaline earth metal salts thereof, such as sodium styrene-3-sulfonate and sodium styrene-4-sulfonate, for example. Particularly preferred are acrylic acid, methacrylic acid, and mixtures thereof.

Examples of phosphorus monomers are vinylphosphonic acid and allylphosphonic acid, for example. Also suitable are the monoesters and diesters of phosphonic acid and phosphoric acid with hydroxyalkyl(meth)acrylates, especially the monoesters. Additionally suitable are diesters of phosphonic acid and phosphoric acid that have been esterified once with a hydroxyalkyl(meth)acrylate and also once with a different alcohol, such as an alkanol, for example. Suitable hydroxyalkyl(meth)acrylates for these esters are those specified below as separate monomers, more particularly 2-hydroxyethyl(meth)acrylate, 3-hydroxypropyl(meth)acrylate, 4-hydroxybutyl(meth)acrylate, etc. Corresponding dihydrogen phosphate ester monomers include phosphoalkyl(meth)acrylates, such as 2-phosphoethyl(meth)acrylate, 2-phosphopropyl(meth)acrylate, 3-phosphopropyl(meth)acrylate, phosphobutyl(meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl(meth)acrylates, phosphodialkyl crotonates and allyl phosphates. Further suitable monomers containing phosphorus groups are described in WO 99/25780 and U.S. Pat. No. 4,733,005, hereby incorporated by reference.

Suitable esters of α,β-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N alkyl and N,N-dialkyl derivatives are acrylamide, methacrylamide, N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide, and N-vinylbutyramide.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate and N,N-dimethylaminocyclohexyl(meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, N-[4-(dimethylamino)cyclohexyl]methacrylamide, etc.

Suitable monomers M) are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable monomers M) are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are, for example, ethylene, propylene, isobutylene, isoprene, butadiene, etc.

Suitable polyether(meth)acrylates are compounds of the general formula (E)

(E)

in which the sequence of the alkylene oxide units is arbitrary, k and l independently of one another are an integer from 0 to 100, the sum of k and l being at least 3, $R^a$ is hydrogen, $C_1$-$C_{30}$ alkyl, $C_5$-$C_8$ cycloalkyl or $C_6$-$C_{14}$ aryl, $R^b$ is hydrogen or $C_1$-$C_8$ alkyl, Y is O or $NR^c$, where $R^c$ is hydrogen, $C_1$-$C_{30}$ alkyl or $C_5$-$C_8$ cycloalkyl.

Preferably k is an integer from 3 to 50, more particularly 4 to 25. Preferably l is an integer from 3 to 50, more particularly 4 to 25.

Preferably $R^a$ in the formula (E) is hydrogen, methyl, ethyl, n-propyl, isopropyl, n-butyl, sec-butyl, n-pentyl, n-hexyl, octyl, 2-ethylhexyl, decyl, lauryl, palmityl or stearyl.

Preferably $R^b$ is hydrogen, methyl, ethyl, n-propyl, isopropyl, n-butyl, sec-butyl, tert-butyl, n-pentyl or n-hexyl, more particularly hydrogen, methyl or ethyl. With particular preference $R^b$ is hydrogen or methyl.

Preferably Y in the formula (A) is O.

In one specific embodiment the free-radical emulsion polymerization for the preparation of Pd) is carried out using at least one polyether(meth)acrylate. In that case this polyether (meth)acrylate is used preferably in an amount of up to 25% by weight, more preferably up to 20% by weight, based on the total weight of the monomers M). For the emulsion polymerization it is particularly preferred to use 0.1% to 20% by weight, preferably 1% to 15% by weight, of at least one polyether(meth)acrylate. Examples of suitable polyether (meth)acrylates are the polycondensation products of the aforementioned α,β-ethylenically unsaturated monocarboxylic and/or dicarboxylic acids and their acid chlorides, acid amides, and acid anhydrides with polyetherols. Suitable polyetherols are readily preparable by reaction of ethylene oxide, 1,2-propylene oxide and/or epichlorohydrin with a starter molecule, such as water or a short-chain alcohol $R^a$—OH. The alkylene oxides can be used individually, in alternation in succession or as a mixture. The polyether acrylates can be used alone or in mixtures for preparing the emulsion polymers employed in accordance with the invention.

The polymer dispersion Pd) preferably comprises in copolymerized form at least one polyether(meth)acrylate selected from compounds of the general formulae I or II or mixtures thereof

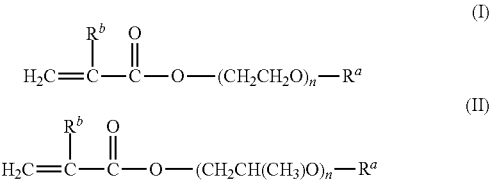

in which
n is an integer from 3 to 15, preferably 4 to 12,
$R^a$ is hydrogen, $C_1$-$C_{20}$ alkyl, $C_5$-$C_8$ cycloalkyl or $C_6$-$C_{14}$ aryl,
$R^b$ is hydrogen or methyl.

Suitable polyether(meth)acrylates are available commercially, in the form for example of various products designated Bisomer® from Laporte Performance Chemicals, UK. They include, for example, Bisomer® MPEG 350 MA, a methoxypolyethylene glycol monomethacrylate.

According to one further preferred embodiment the free-radical emulsion polymerization for the preparation of Pd) is carried out not using any polyether (meth)acrylate.

In a further specific embodiment the free-radical emulsion polymerization for the preparation of Pd) is carried out using at least one monomer containing urea groups. This urea-functional monomer is used preferably in an amount of up to 25% by weight, more preferably up to 20% by weight, based on the total weight of the monomers M). For the emulsion polymerization it is particularly preferred to use 0.1% to 20% by weight, more particularly 1% to 15% by weight, of at least one monomer containing urea groups. Examples of suitable monomers containing urea groups are N-vinylurea or N-allylurea or derivatives of imidazolidin-2-one. They include N-vinyl- and N-allylimidazolidin-2-one, N-vinyloxyethylimidazolidin-2-one, N-(2-(meth)acrylamidoethyl)imidazolidin-2-one, N-(2-(meth)acryloxyethyl)imidazolidin-2-one (i.e., 2-ureido(meth)acrylate), N-[2-((meth)acryloxyacetamido)ethyl]imidazolidin-2-one, etc.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureidomethacrylate, UMA).

Suitable vinyl monomers having crosslinking groups are allyl, glycidyl or hydroxyalkyl(meth)acrylates, acetoacetoxy esters, acetoacetoxyamides, keto-functional and aldehyde-functional vinyl monomers, keto-group-containing amides, and silane-functional (meth)acrylic monomers. Preferred are diacetoneacrylamide, acetoacetoxyethyl acrylate, and acetoacetoxyethyl methacrylate (AAEM). These vinyl monomers are capable of reaction with a crosslinker which has functional groups that are capable of a reaction with a complementary crosslinking group in the vinyl monomer. Examples of suitable crosslinkers are dihydrazides such as adipic dihydrazide (ADDH), etc.

According to one further preferred embodiment the free-radical emulsion polymerization for the preparation of Pd) is carried out using no monomer containing urea groups.

The aforementioned monomers M) may be used individually, in the form of mixtures within one class of monomer, or in the form of mixtures from different classes of monomer.

For the emulsion polymerization it is preferred to use at least 40%, more preferably at least 60%, and more particularly at least 80%, by weight, based on the total weight of the monomers M), of at least one monomer M1) selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof (principal monomers). Preferably the monomers M1) are used for the emulsion polymerization in an amount of up to 99.9%, more preferably up to 99.5%, more particularly up to 99%, by weight, based on the total weight of the monomers M).

The principal monomers M1) are preferably selected from methyl(meth)acrylate, ethyl(meth)acrylate, n-propyl(meth)acrylate, isopropyl(meth)acrylate, n-butyl(meth)acrylate, sec-butyl(meth)acrylate, tert-butyl(meth)acrylate, n-pentyl(meth)acrylate, n-hexyl(meth)acrylate, n-heptyl(meth)acrylate, n-octyl(meth)acrylate, ethylhexyl(meth)acrylate, styrene, 2-methylstyrene, vinyl acetate, acrylonitrile, methacrylonitrile, butadiene, and mixtures thereof.

In addition to at least one principal monomer M1) it is also possible in the free-radical emulsion polymerization for the preparation of Pd) to use at least one further monomer M2), which is generally present in a minority amount (secondary monomers). For the emulsion polymerization it is preferred to use up to 60%, more preferably up to 40%, and more particularly up to 20%, by weight, based on the total weight of the monomers M), of at least one monomer M2) selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl(meth)acrylates, $C_1$-$C_{10}$ hydroxyalkyl(meth)acrylamides, polyether(meth)acrylates, monomers containing urea groups, acetoacetoxyalkyl(meth)acrylates, acetoacetoxyalkyl(meth)acrylamides, and mixtures thereof. Preferably the monomers M2), when present, are used for the emulsion polymerization in an amount of at least 0.1%, more preferably at least 0.5%, more particularly at least 1%, by weight, based on the total weight of the monomers M).

For the emulsion polymerization it is particularly preferred to use 0.1% to 60%, preferably 0.5% to 40%, more particularly 0.1% to 20%, by weight of at least one monomer M2). The monomers M2) are especially selected from acrylic acid, methacrylic acid, itaconic acid, maleic acid, fumaric acid, maleic anhydride, acrylamide, methacrylamide, 2-hydroxyethyl acrylate, 2-hydroxyethyl methacrylate, 2-hydroxyethylacrylamide, 2-hydroxyethylmethacrylamide, methoxypolyethylene glycol monomethacrylate, 2-ureidomethacrylate, acetoacetoxyethyl methacrylate, and mixtures thereof.

Particularly suitable monomer combinations for the process of the invention are those set out below:
$C_1$-$C_{10}$ alkyl(meth)acrylates and mixtures thereof, especially
ethylhexyl acrylate, methyl methacrylate;
n-butyl acrylate, methyl methacrylate;
n-butyl acrylate, ethylhexyl acrylate.
Mixtures of at least one $C_1$-$C_{10}$ alkyl(meth)acrylate and at least one vinylaromatic, especially
n-butyl acrylate, methyl methacrylate, styrene;
n-butyl acrylate, styrene;

n-butyl acrylate, ethylhexyl acrylate, styrene;
ethylhexyl acrylate, styrene;
ethylhexyl acrylate, methyl methacrylate, styrene.

Mixtures of at least one vinylaromatic and at least one olefin, selected from $C_2$-$C_8$ monoolefins and nonaromatic hydrocarbons having at least two conjugated double bonds, especially styrene, butadiene.

The aforementioned particularly suitable monomer combinations may additionally comprise small amounts of further monomers M2). The latter monomers M2) are preferably selected from acrylic acid, methacrylic acid, acrylamide, methacrylamide, methoxypolyethylene glycol monomethacrylate, 2-ureidomethacrylate, acetoacetoxyethyl methacrylate, and mixtures thereof.

In the preparation of the polymer dispersions of the invention it is possible to use at least one crosslinker in addition to the aforementioned monomers M). Monomers which possess a crosslinking function are compounds having at least two polymerizable, ethylenically unsaturated, nonconjugated double bonds in the molecule. Crosslinking may also take place, for example, by means of functional groups which are able to enter into a chemical crosslinking reaction with complementary functional groups. In that case the complementary groups may both be attached to the emulsion polymer. For the crosslinking it is possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, contain at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis (hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl(meth)acrylate, acetoacetoxyethyl(meth)acrylate and, more particularly, diacetoneacrylamide. The crosslinkers are preferably compounds with at least two functional groups, more particularly two to five functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker).

One specific embodiment relates to polymer dispersions Pd) which comprise no copolymerized crosslinker.

The free-radical polymerization of the monomer mixture M) may take place in the presence of at least one regulator. Regulators are used preferably in an amount of 0.0005% to 5%, more preferably of 0.001% to 2.5%, and more particularly of 0.01% to 1.5% by weight, based on the total weight of the monomers used for the polymerization.

Regulators (polymerization regulators) is a general term for compounds having high transfer constants. Regulators accelerate chain transfer reactions to bring about reduction in the degree of polymerization of the resultant polymers without affecting the overall reaction rate. Regulators may be subdivided into monofunctional, difunctional or polyfunctional regulators, depending on the number of functional groups in the molecule that are able to lead to one or more chain transfer reactions. Suitable regulators are described comprehensively, for example, by K. C. Berger and G. Brandrup in J. Brandrup, E. H. Immergut, Polymer Handbook, $3^{rd}$ ed., John Wiley & Sons, New York, 1989, p. 11/81-11/141.

Examples of suitable regulators include aldehydes such as formaldehyde, acetaldehyde, propionaldehyde, n-butyraldehyde, and isobutyraldehyde.

Other regulators which can also be used are as follows: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether.

As regulators it is preferred to use compounds containing sulfur in bound form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which acquire sulfur in the form of SH groups, also referred to as mercaptans). Preferred regulators are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of difunctional regulators, containing two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butanediol bisthioglycolate. Examples of polyfunctional regulators are compounds which comprise more than two sulfur atoms in bound form. Examples thereof are trifunctional and/or tetrafunctional mercaptans.

All of the stated regulators may be used individually or in combination with one another. One specific embodiment relates to polymer dispersions Pd) which are prepared by free-radical emulsion polymerization without the addition of a regulator.

To prepare the polymers it is possible to polymerize the monomers with the aid of initiators that form free radicals.

As initiators for the free-radical polymerization it is possible to employ the peroxo and/or azo compounds customary for the purpose, examples being alkali metal or ammonium peroxidisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxidicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis (2-amidinopropane)dihydrochloride or 2,2'-azobis(2-methylbutyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing components the compound in question comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixtures—for example, a mixture of the sodium salt of hydroxymethanesulfinic acid with sodium disulfite.

The amount of initiators is generally 0.1% to 10% by weight, preferably 0.1% to 5% by weight, based on all of the monomers to be polymerized. It is also possible to use two or more different initiators in the emulsion polymerization.

The preparation of the polymer dispersion Pd) takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyltriethylammonium chloride or quaternary compounds of N—$C_6$-$C_{20}$ alkylpyridines, -morpholines or -imidazoles, e.g., N-laurylpyridinium chloride.

The amount of emulsifier is generally about 0.01% to 10% by weight, preferably 0.1% to 5% by weight, based on the amount of monomers to be polymerized.

The highly branched polycarbonates used in accordance with the invention are generally dispersible in water. Not dispersible in water, as an exception to this rule, are highly branched polycarbonates which have been subjected to a polymer-analogous reaction with hydrophobic groups. In one specific embodiment the highly branched polycarbonates are suitable for the preparation of a polymer dispersion Pd) without the use of surface-active substances, such as emulsifiers, protective colloids or monomers containing actively dispersing groups.

The polymerization takes place in general at temperatures in a range from 0 to 150° C., preferably 20 to 100° C., more preferably 30 to 95° C. The polymerization takes place preferably under atmospheric pressure, although a polymerization under elevated pressure is also possible, such as under the autogenous pressure of the components used for the polymerization. In one suitable version the polymerization takes place in the presence of at least one inert gas, such as nitrogen or argon, for example.

The polymerization medium may be composed either of water alone or of mixtures of water and water-miscible liquids such as methanol. Preferably just water is used. The emulsion polymerization may be carried out either as a batch operation or in the form of a feed process, including staged or gradient procedures. Preference is given to the feed process, in which a portion of the polymerization batch or else a polymer seed is introduced as an initial charge and heated to the polymerization temperature, polymerization is commenced, and then the remainder of the polymerization batch, typically by way of two or more spatially separate feeds, of which one or more comprise the monomers in pure form or in emulsified form, is supplied to the polymerization zone continuously, in stages or under the superimposition of a concentration gradient, with the polymerization being maintained.

The manner in which the initiator is added to the polymerization vessel in the course of the free-radical aqueous emulsion polymerization is known to a person of ordinary skill in the art. It can be included in its entirety in the initial charge to the polymerization vessel, or else employed in stages or continuously in accordance with the rate of its consumption in the course of the free-radical aqueous emulsion polymerization. In each case this will depend, in a manner known per se to a person of ordinary skill in the art, both on the chemical nature of the initiator system and on the polymerization temperature. Preferably a portion is included in the initial charge and the remainder is supplied to the polymerization zone in accordance with the rate of its consumption.

The dispersions that are formed in the polymerization may be subjected, following the polymerization operation, to a physical or chemical aftertreatment. Examples of such techniques are the known techniques for residual monomer reduction, such as aftertreatment by addition of polymerization initiators or mixtures of two or more polymerization initiators at suitable temperatures; aftertreatment of the polymer solution by means of water vapor or ammonia vapor; or stripping with inert gas; or treatment of the reaction mixture with oxidizing or reducing reagents; adsorption techniques such as the adsorption of impurities on selected media such as activated carbon, for example; or an ultrafiltration, for example.

The aqueous polymer dispersion Pd) obtained typically has a solids content of 20% to 70% by weight, preferably 40% to 70% by weight, more preferably 45% to 70% by weight, and with more particular preference of 45% to 65% by weight, based on the polymer dispersion.

The polymer dispersions Pd) may additionally be admixed with typical auxiliaries and additives. These include, for example, pH modifiers, reducing agents and bleaches, such as the alkali metal salts of hydroxymethane sulfinic acid (e.g., Rongalit® C from BASF Aktiengesellschaft), complexing agents, deodorants, flavors, odorants, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

On the basis of the highly branched polycarbonates with at least one $C_8$ to $C_{32}$ alkenyl radical having at least one carbon-carbon double bond that are used in accordance with the invention, the polymer dispersions Pd) are chemically postcrosslinkable. In one specific embodiment, the crosslinking reaction is an oxidative crosslinking. In that case it may be of advantage to accelerate this postcrosslinking through additization of the aqueous polymer dispersion. This is the case especially if the postcrosslinking is to take place at low temperatures, as for example in a range below the ambient temperature or in the region of the ambient temperature (for example, −10 to 50° C., more especially 0 to 45° C.).

Suitable additives for accelerating the postcrosslinking are radical-forming initiators and/or dryers (siccatives). Suitable radical-forming initiators are, in principle, organic peroxides, organic azo compounds, C—C-cleaving initiators such as dialkyl peroxides, peroxocarboxylic acids, peroxodicarbonates, peroxide esters, hydroperoxides, ketone peroxides, azodinitriles, benzpinacol silyl ethers, benzophenone, benzophenone derivatives, and combinations thereof.

Compounds suitable for siccativization are the metal compounds recommended for aqueous alkyd resins, based for example on Co or Mn (reviewed in U. Poth, Polyester and Alkydharze, Vincentz Network 2005, p. 183 f).

Additives for postcrosslinking are used in each case in an amount of 0.0005% to 5%, preferably 0.001% to 2.5%, more particularly 0.01% to 1.5%, by weight, based on the total weight of the monomers used for the polymerization (including crosslinker if present).

The highly branched polycarbonates used in accordance with the invention are distinguished by high compatibility with a large number of different dispersions.

The highly branched polycarbonates used in accordance with the invention are suitable advantageously for enhancing the curing properties of aqueous polymer dispersions.

The highly branched polycarbonate is added to the polymer dispersion Pd) preferably in an amount of 0.1% to 30%, more preferably of 0.5% to 20%, more particularly of 1.0% to 10%, by weight, based on the weight fraction of the emulsion polymer. Typical amounts in which the highly branched polycarbonate is used are located, for example, within a range from 1% to 5%, based on the weight fraction of the emulsion polymer in the polymer dispersion Pd).

The amount of the emulsion polymer and of the highly branched polycarbonates in the aqueous polymer dispersion Pd) (solids content) is located preferably within a range from 30% to 60%, more preferably 40% to 50%.

The aqueous polymer dispersions Pd) of the invention which comprise an emulsion polymer and at least one highly branched polycarbonate can be used, as they are or mixed with further polymers, as a binder composition in aqueous coating compositions, such as coating materials, examples being paint or varnish mixtures. Suitable further polymers are, for example, film-forming polymers. These include, for example, alkyd resins. Suitable alkyd resins are, for example, water-soluble or water-convertible ("water-reducible", i.e., which can be converted by aqueous NaOH or $NH_3$ from a solution in a solvent into an aqueous solution) alkyd resins, which preferably have a weight-average molecular weight of 5000 to 40 000 g/mol. Additionally suitable are aqueous alkyd resin emulsions or modified aqueous alkyd resin emulsions. Modified here means that the alkyd resin is equipped with groups such as (poly)urethane, silane, etc. Modified alkyd resin emulsions of this kind typically have relatively high weight-average molecular weights, i.e., of more than 40 000 g/mol, especially of more than 100 000 g/mol.

An alkyd resin is understood to be a polyester which is esterified with a drying oil, with a fatty acid or the like (U. Poth, Polyester and Alkydharze, Vincentz Network 2005).

An aqueous alkyd resin is understood more particularly to be an alkyd resin solution which is water-dilutable, optionally after neutralization. It is based on an alkyd resin having a sufficiently high acid number, preferably in the range from 20 to 80 mg KOH/g alkyd resin (solid). The weight-average molecular weight is preferably in a range from 5000 to 40 000 daltons, more preferably from 8000 to 35 000 daltons, and more particularly from 10 000 to 35 000 daltons. The molecular weights can be determined by size exclusion chromatography (SEC). By acid number is meant the amount of potassium hydroxide, expressed in mg, which is necessary to neutralize 1 g of the sample (solid). The oil or fatty acid used is the property-determining component. It permits subdivision according to fatty acid triacylglycerol content (oil content, oil length) (or, in the case of those alkyds in which the fatty acids are incorporated, following corresponding arithmetic conversion, as referred to below) into short-oil alkyd resins with <40%, medium-oil alkyd resins with 40% to 60%, and long-oil alkyd resins with >60% triacylglycerol, based on solvent-free alkyd resin (fatty acid content is arithmetically converted, optionally, into triacylglycerol, the factor being approximately 1.045) (oil content).

According to general practice, the solids content characterizes the "active ingredient content" of the dispersion. The dispersion is usually dried to constant weight at a temperature between 100 and 140° C. (see ISO standard 1625). The solids content indicates the dry mass in comparison to the total mass (in %). The dry mass comprises the polymer, emulsifiers, and inorganic salts (from initiator decomposition and neutralization). The volatile constituents include the water and those monomers not reacted during the polymerization.

The oil content of the alkyd resins additionally used in aqueous polymer dispersions Pd) of the invention is preferably 25% to 55%. The solids content of the alkyd resins in the as-supplied form is generally 30% to 80%, while in the as-used form (i.e., after dilution with $NH_3$ or NaOH/water) it is usually 35% to 50%.

Preferred alkyd resins are, for example, the products WorléeSol 61A, WorléeSol 61E, WorléeSol 65A from Worlée, and Synthalat W46 or Synthalat W48 from Synthopol.

By an aqueous alkyd resin emulsion or, for short, alkyd emulsion is meant alkyd resins which optionally with addition of emulsifiers, are dispersed in water. In comparison to water-soluble or dilutable alkyd resins, suitability for this purpose is also possessed by alkyds having relatively high average molar masses (U. Poth, Polyester und Alkydharze, Vincentz Network 2005, p. 208 f.).

By an aqueous polyurethane-alkyd resin emulsion is meant a polyurethane-modified alkyd resin which has been dispersed in water. Urethane modification may be accomplished during alkyd synthesis, for example, by replacing some of the usual phthalic anhydride with a diisocyanate [U. Poth, Polyester und Alkydharze, Vincentz Network 2005, section 4.4.3.3. "Urethanmodifizierte Alkydharze" on page 205]. Urethane modification can additionally be accomplished by reacting an alkyd with an at least difunctional polyisocyanate (DE 10 2006 054237).

Preferred alkyd resin emulsions feature an oil content of 25% to 55% and an acid number of 20 to 60 mg KOH/g. Preferred alkyd resin emulsions and polyurethane-modified alkyd resin emulsions are WorleeSol E 150 W, WorleeSol E 280 W, WorleeSol E 530 W or WorleeSol E 927 W.

The use of such further film-forming polymers, especially alkyd resins, which raise the VOC content of the coating compositions, is in some circumstances not preferred. One special embodiment is therefore a coating composition, especially a coating material, that comprises at least one dispersion Pd) and at least one highly branched polycarbonate, but no film-forming polymer other than the emulsion polymer present in the polymer dispersion.

The binder compositions of the invention are employed preferably in aqueous coating materials. These coating materials take the form, for example, of an unpigmented system (clear varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: $PVC=(V_P+V_F)\times100/(V_P+V_F+V_B)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| high-gloss paint | about 15-20 |
| exterior masonry paint, white | about 45-55 |
| clear varnish | 0 |

The invention thus further provides a coating material in the form of an aqueous composition, comprising
   a binder composition as defined above,
   optionally at least one pigment,
   optionally at least one filler,
   optionally, further auxiliaries, other than pigments and fillers, and
   water.

A first preferred embodiment is a coating material in the form of a clear varnish which comprises no pigments and fillers.

A second preferred embodiment is a coating material in the form of an emulsion paint.
   Preference is given to a coating material comprising:
   10% to 60% by weight, based on the solids content, of at least one dispersion Pd) as defined above,
   10% to 70% by weight of inorganic fillers and/or inorganic pigments,
   0.1% to 20% by weight of typical auxiliaries, and
   water to 100% by weight.

The fraction of Pd) as a proportion of the above coating compositions based on solids, i.e., emulsion polymer and highly branched polycarbonate(s), without water.

Elucidated in the text below is the composition of a typical emulsion paint. Emulsion paints comprise generally 30% to 75%, and preferably 40% to 65%, by weight of solids. By these are meant all constituents of the preparation which are not water, but at least the total weight of binder, filler, pigment, plasticizer, and polymeric auxiliaries. Solvents, including low-volatility solvents, are not part of the solids content. This figure is accounted for to the extent of about
   a) 3% to 90%, more particularly 10% to 60%, by weight, by the polymer dispersion Pd),
   b) 0% to 85%, preferably 5% to 60%, more particularly 10% to 50%, by weight, by at least one inorganic pigment,
   c) 0% to 85%, more particularly 5% to 60%, by weight, by inorganic fillers, and
   d) 0.1% to 40%, more particularly 0.5% to 20%, by weight, by typical auxiliaries.

The term "pigment" is used in the context of this invention comprehensively to identify all pigments and fillers, examples being color pigments, white pigments, and inorganic fillers. These include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers.

Finely divided fillers may also be used to increase the hiding power and/or to save on the use of white pigments. For adjustment of the hiding power of the hue and of the depth of color, it is preferred to use blends of color pigments and fillers.

The coating composition of the invention (aqueous coating material) may comprise further auxiliaries, in addition to the polymer dispersion Pd) having at least one highly branched polycarbonate of the invention as an additive, optionally additional film-forming polymers, and pigment/filler.

The typical auxiliaries, in addition to the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Suitable thickeners are, for example, associative thickeners, such as polyurethane thickeners. The amount of the thickener is preferably less than 1% by weight, more preferably less than 0.6% by weight, of thickener, based on the solids content of the coating material.

The coating materials of the invention are produced in a known way by blending the components in mixing apparatus customary for the purpose. It has been found appropriate to prepare an aqueous paste or dispersion from the pigments, water, and, optionally, the auxiliaries, and only then to mix the polymeric binder, i.e., in general, the aqueous dispersion of the polymer, with the pigment paste or pigment dispersion.

The coating materials of the invention comprise generally 30% to 75%, and preferably 40% to 65%, by weight of nonvolatile constituents. By these are meant all constituents of the preparation which are not water, but at least the total amount of binder, pigment, and auxiliary, based on the solids content of the coating material. The volatile constituents are primarily water.

Suitable coating materials include highly glossy coating materials. The gloss of the coating material can be determined by DIN 67530. In this case the coating material is applied with slot width of 240 μm to a glass plate and is dried at room temperature for 72 hours. The test specimen is inserted into a calibrated reflectometer, and a determination is made, with a defined angle of incidence, of the extent to which the light returned has been reflected or scattered. The reflectometer value determined is a measure of the gloss (the higher the value, the higher the gloss).

The coating material of the invention may be applied to substrates in a typical way, as for example by spreading, spraying, dipping, rolling, knife coating, etc.

It is used preferably as an architectural coating material, i.e., for coating buildings or parts of buildings. The substrates in question may be mineral substrates such as renders, plaster or plasterboard, masonry or concrete, wood, woodbase materials, metal or paper, wallpaper for example, or plastic, PVC for example.

The coating material is used preferably for internal parts of buildings, such as interior walls, internal doors, paneling, banisters, furniture, etc. The coating material also finds preferred application for outdoor applications such as garden fences, railings, wood parts, etc.

The coating materials of the invention feature ease of handling, good processing properties, and high hiding power. Their pollutant content is low. They have good performance properties, such as high water resistance, good wet adhesion, in particular on alkyd paints, high blocking resistance, good recoatability, and good flow on application. The equipment used is easily cleaned with water.

Polymer dispersions Pd) of the invention for use in paper coating slips preferably comprise an emulsion polymer comprising in copolymerized form at least one monomer M) or a monomer combination selected from:

$C_1$-$C_{10}$ alkyl(meth)acrylates and mixtures thereof, mixtures of at least one $C_1$-$C_{10}$ alkyl(meth)acrylate and at least one vinylaromatic, more particularly styrene, mixtures of at least one vinylaromatic (more particularly styrene) and at least one olefin selected from $C_2$-$C_8$ monoolefins and nonaromatic hydrocarbons having at least two conjugated double bonds (more particularly butadiene).

One specific embodiment of the emulsion polymer are polybutadiene binders which comprise in copolymerized form butadiene and a vinylaromatic, more particularly styrene, and also, optionally, at least one further monomer. The weight ratio of butadiene to vinylaromatic is, for example, 10:90 to 90:10, preferably 20:80 to 80:20.

Particularly preferred are polybutadiene binders where the emulsion polymer is composed of at least 40%, preferably at least 60%, more preferably at least 80%, more particularly at least 90%, by weight of hydrocarbons having 2 double bonds, more particularly butadiene, or of mixtures of such hydrocarbons with vinylaromatics, more particularly styrene.

A further specific embodiment of the emulsion polymer are polyacrylate binders which comprise in copolymerized form at least one $C_1$-$C_{10}$ alkyl(meth)acrylate or a mixture of at least one $C_1$-$C_{10}$ alkyl(meth)acrylate and at least one vinylaromatic (more particularly styrene).

Besides the principal monomers it is possible for the emulsion polymers present in the polybutadiene binders and in the polyacrylate binders to comprise further monomers, examples being monomers with carboxylic, sulfonic or phosphonic acid groups. Preference is given to monomers with carboxylic acid groups, examples being acrylic acid, methacrylic acid, itaconic acid, maleic acid or fumaric acid, and aconitic acid. In one preferred embodiment the emulsion polymers comprise in copolymerized form at least one ethylenically unsaturated acid in an amount of 0.05% by weight to 5% by weight, based on the total weight of the monomers employed.

Further monomers are, for example, monomers comprising hydroxyl groups, more particularly $C_1$-$C_{10}$ hydroxyalkyl (meth)acrylates, or amides such as (meth)acrylamide.

Ingredients of paper coating slips include, in particular a) binder b) optionally a thickener c) optionally, a fluorescent or phosphorescent dye, more particularly as an optical brightener d) pigments e) further auxiliaries, examples being flow control additives, or other dyes.

The binder used is the above aqueous polymer dispersion Pd) which comprises the emulsion polymer and the highly branched polycarbonates. Further binders, including natural polymers, for example, such as starch, may be used as well. The fraction of the above aqueous polymer dispersion (calculated as solids, i.e., emulsion polymer and highly branched polycarbonates, without water) is preferably at least 50%, more preferably at least 70%, or 100%, by weight, based on the total amount of binder.

The paper coating slips comprise binder preferably in amounts of 1 to 50 parts by weight, more preferably of 5 to 20 parts by weight, of binder, based on 100 parts by weight of pigment.

Suitable thickeners b) include, as well as synthetic polymers, celluloses in particular, preferably carboxymethylcellulose.

The term pigment d) refers here to inorganic solids. These solids, as pigments, are responsible for the color of the paper coating slip (white in particular) and/or merely have the function of an inert filler. The pigment generally comprises white pigments, examples being barium sulfate, calcium carbonate, calcium sulfoaluminate, kaolin, talc, titanium dioxide, zinc oxide, chalk or coating clay or silicates.

The paper coating slip can be produced by customary methods.

The paper coating slips of the invention have a low viscosity and are highly suitable for the coating, for example, of base paper or cardboard. Coating and subsequent drying may take place by typical methods. The coated papers or cardboards have good performance properties, and more particularly can also be printed effectively in the known printing processes, such as flexographic, letterpress, gravure or offset printing. In the offset process in particular they result in high pick resistance and rapid and effective take-up of ink and water. The papers coated with the paper coating slips can be used to good effect in all printing processes, more particularly in the offset process.

The invention further provides for the use of an aqueous polymer dispersion Pd), as defined above, as a base material for adhesives, for producing membranes, as a binder or auxiliary for leather and textiles, in the nonwovens sector, in detergents and cleaning products, in the building sector, for modifying plastics, in hydraulically setting compositions, as components for toner formulations, or as an additive in electrophotographic applications.

The invention is elucidated in more detail with reference to the following, nonlimiting examples.

EXAMPLES

I. Synthesis of Highly Branched Polymers

Starting Materials:
Polyol 1: Reaction product of trimethylolpropane and a 12-fold molar excess of ethylene oxide.
DBTL: Di-n-butyltin dilaurate
Nouracid HE30: Fatty acid mixture from sunflower oil; product of OLEON GmbH, D-46446 Emmerich.
Nouracid LE80: Fatty acid mixture from linseed oil; product of OLEON GmbH, D-46446 Emmerich.

The hyperbranched polymers were analyzed by gel permeation chromatography using a refractometer as detector. The mobile phase used was dimethylacetamide, while the standard employed for determining molecular weight was polymethyl methacrylate (PMMA).

The iodine number was determined using the method of Kaufmann. The acid number was determined in accordance with DIN 53402. The hydroxyl number was determined in accordance with DIN 53240, part 2.

Comparative Example 1

Synthesis of a Hyperbranched Polycarbonate Without Unsaturated Fatty Acid

A 5 l HWS vessel with stirrer, reflux condenser, internal thermometer, and nitrogen inlet was charged with 3350.0 g (5.00 mol) of polyol 1 and 590.7 g (5.00 mol) of diethyl carbonate and the mixture was adjusted to the pH of 9 by addition of 0.5 g of potassium hydroxide. The reaction mixture was heated slowly to reflux with stirring, and the boiling reaction mixture was stirred until its boiling temperature had dropped from 140° C. to a temperature of 110° C. The reflux condenser was then replaced by a descending condenser with collecting vessel, and the low-boiling fractions present in the reaction mixture were removed by distillation, the temperature of the reaction mixture being increased to 200° C. The distillate was collected and weighed, and in this way the conversion was determined as a percentage of the theoretically possible full conversion. When a conversion of 88% had been reached (405 g of distillate), the reaction mixture was cooled and adjusted to a pH of 6 by addition of 85% strength phosphoric acid. Subsequently the reaction mixture was heated to 140° C. and stirred for 10 minutes under a reduced pressure of 40 mbar to remove residual volatile constituents.

The hyperbranched polycarbonate was characterized as follows: Mn=2750 g/mol, Mw=5660 g/mol, OH number=151 mg KOH/g polymer.

Inventive Example 2

Synthesis of a Hyperbranched Polycarbonate with Linoleic Acid Residues

A 1000 ml four-neck flask with stirrer, reflux condenser, internal thermometer, and nitrogen line was charged with 508.4 g (0.759 mol) of polyol 1 and 122.2 g (1.035 mol) of diethyl carbonate and the mixture was adjusted to the pH of 9 by addition of potassium hydroxide. The reaction mixture was heated slowly to reflux with stirring, and the boiling reaction mixture was stirred until its boiling temperature had dropped from 130° C. to a temperature of 112° C. The reflux condenser was then replaced by a descending condenser with collecting vessel, and the low-boiling fractions present in the reaction mixture were removed by distillation, the temperature of the reaction mixture being increased to 180° C. The distillate was collected and weighed, and in this way the conversion was determined as a percentage of the theoretically possible full conversion. When a conversion of 59% had been reached (55.8 g of distillate), the reaction mixture was cooled and 19.3 g (0.069 mol) of Nouracid HE30 and one drop of DBTL were added. The reaction was heated again and stirred at 200° C. for a period of 4 hours. Then the reaction was cooled and adjusted to a pH of 6 by addition of 85% strength phosphoric acid. Subsequently the reaction mixture was heated to 140° C. and stirred for 1 hour under a reduced pressure of 100 mbar to remove residual volatile constituents.

The hyperbranched polycarbonate with linoleic acid residues was characterized as follows: Mn=3090 g/mol, Mw=8640 g/mol, acid number=3 mg KOH/g polymer, iodine number=4.3 g iodine/100 g polymer.

Inventive Example 3

Synthesis of a Hyperbranched Polycarbonate with Linolenic Acid Residues

A 1000 ml four-neck flask with stirrer, reflux condenser, internal thermometer, and nitrogen line was charged with 508.5 g (0.759 mol) of polyol 1 and 122.3 g (1.035 mol) of diethyl carbonate and the mixture was adjusted to the pH of 9 by addition of potassium hydroxide. The reaction mixture was heated slowly to reflux with stirring, and the boiling reaction mixture was stirred until its boiling temperature had dropped from 130° C. to a temperature of 112° C. The reflux condenser was then replaced by a descending condenser with collecting vessel, and the low-boiling fractions present in the reaction mixture were removed by distillation, the temperature of the reaction mixture being increased to 180° C. The distillate was collected and weighed, and in this way the conversion was determined as a percentage of the theoretically possible full conversion. When a conversion of 58% had been reached (56 g of distillate), the reaction mixture was cooled and 19.2 g (0.069 mol) of Nouracid LE80 and one drop of DBTL were added. The reaction was heated again and stirred at 200° C. for a period of 4 hours. Then the reaction was cooled and adjusted to a pH of 6 by addition of 85% strength phosphoric acid. Subsequently the reaction mixture was heated to 140° C. and stirred for 30 minutes under a reduced pressure of 100 mbar to remove residual volatile constituents.

The hyperbranched polycarbonate with linolenic acid residues was characterized as follows: Mn=3270 g/mol, Mw=8070 g/mol, acid number=4 mg KOH/g polymer, iodine number=6.4 g iodine/100 g polymer.

Inventive Example 4

Synthesis of a Hyperbranched Polycarbonate with Linoleic Acid Residues

A 500 ml four-neck flask with stirrer, reflux condenser, internal thermometer, and nitrogen line was charged with 238.2 g (0.356 mol) of polyol 1 and 57.3 g (0.485 mol) of diethyl carbonate and the mixture was adjusted to the pH of 9 by addition of potassium hydroxide. The reaction mixture was heated slowly to reflux with stirring, and the boiling reaction mixture was stirred until its boiling temperature had dropped from 130° C. to a temperature of 112° C. The reflux condenser was then replaced by a descending condenser with collecting vessel, and the low-boiling fractions present in the reaction mixture were removed by distillation, the temperature of the reaction mixture being increased to 180° C. The distillate was collected and weighed, and in this way the conversion was determined as a percentage of the theoretically possible full conversion. When a conversion of 55% had been reached (24.4 g of distillate), the reaction mixture was cooled and 4.5 g (0.016 mol) of Nouracid HE30 and one drop of DBTL were added. The reaction was heated again and stirred at 200° C. for a period of 4 hours. At a conversion of 75% (33.6 g of distillate) the reaction was cooled and adjusted to a pH of 6 by addition of 85% strength phosphoric acid. Subsequently the reaction mixture was heated to 140° C. and stirred for 1 hour under a reduced pressure of 100 mbar to remove residual volatile constituents.

The hyperbranched polycarbonate with linoleic acid residues was characterized as follows: Mn=4000 g/mol, Mw=20 000 g/mol, acid number=1 mg KOH/g polymer, iodine number=3.6 g iodine/100 g polymer.

Inventive Example 5

Synthesis of a Hyperbranched Polycarbonate with Linolenic Acid Residues

A 1000 ml four-neck flask with stirrer, reflux condenser, internal thermometer, and nitrogen line was charged with 487 g (0.727 mol) of polyol 1 and 117 g (0.99 mol) of diethyl carbonate and the mixture was adjusted to the pH of 9 by addition of potassium hydroxide. The reaction mixture was heated slowly to reflux with stirring, and the boiling reaction mixture was stirred until its boiling temperature had dropped from 130° C. to a temperature of 112° C. The reflux condenser was then replaced by a descending condenser with collecting vessel, and the low-boiling fractions present in the reaction mixture were removed by distillation, the temperature of the reaction mixture being increased to 180° C. The distillate was collected and weighed, and in this way the conversion was determined as a percentage of the theoretically possible full conversion. When a conversion of 60% had been reached (55 g of distillate), the reaction mixture was cooled and 46 g (0.165 mol) of Nouracid LE80 and one drop of DBTL were added. The reaction was heated again and stirred at 200° C. for a period of 4 hours until the acid number had dropped to 4 mg KOH/g polymer. Then the reaction was cooled and adjusted to a pH of 6 by addition of 85% strength phosphoric acid. Subsequently the reaction mixture was heated to 140° C. and stirred for 1 hour under a reduced pressure of 100 mbar to remove residual volatile constituents.

The hyperbranched polycarbonate with linolenic acid residues was characterized as follows: Mn=2510 g/mol, Mw=7160 g/mol, acid number=4 mg KOH/g polymer, iodine number=15.0 g iodine/100 g polymer.

II. Preparation of Polymer Dispersions

Inventive Example 5

Preparation of Dispersion I

A polymerization vessel equipped with metering device and temperature regulation was charged as follows:
Initial Charge:

| | |
|---|---|
| 528.0 g | water |
| 46.7 g | a polystyrene seed dispersion having a solids content of 33% and an average particle size of 30 nm |
| 3.67 g | a 15% strength aqueous solution of sodium lauryl sulfate |

This was followed by heating to 85° C. with stirring. Subsequently, with this temperature maintained, 5% by weight of feed 2 was added, and the mixture was stirred for 5 minutes. Thereafter feed 1 was metered in over 180 minutes and, in parallel therewith, the remainder of feed 2 over 195 minutes.
Feed 1:

| | |
|---|---|
| 543.2 g | water |
| 125.4 g | a 15% strength aqueous solution of sodium lauryl sulfate |
| 458.0 g | n-butyl acrylate |
| 399.6 g | methyl methacrylate |
| 165.1 g | styrene |
| 22.78 g | methacrylic acid |
| 21.45 g | ureidomethacrylate (N-(2-methacryloyloxyethyl)imidazolidin-2-one) |
| 33.0 g | Bisomer MPEG 350 MA (methoxypolyethylene glycol monomethacrylate from Laporte Performance Chemicals, UK) |

Feed 2:

| | |
|---|---|
| 83.6 g | water |
| 4.4 g | sodium peroxodisulfate |

After the end of feed 1, 22 g of water were added; after the end of feed 2, postpolymerization was carried out for 30 minutes, followed by neutralization with 7.47 g of ammonia (25% strength aqueous solution). Thereafter 13.2 g of hydrogen peroxide (5% strength aqueous solution) were added and a solution of 0.557 g of ascorbic acid in 4.96 g of water was metered in over 60 minutes. The dispersion was then allowed to cool and was filtered through a 125 µm filter. This gave 2.48 kg of a 46% dispersion.

III. Performance Examples

1. Determination of Pendulum Hardness

Acrylate dispersion I was used without any addition or else mixed in a ratio of 95:5 in each case (based on total solids weight of the dispersion and solid hyperbranched polymer) with hyperbranched polymers as specified in table 1. Thereafter, pure binder films (wet film thickness: 250 µm) were applied to a substrate, and the development of the Konig pendulum hardness (determined in accordance with DIN 53157) was followed over time. The results are summarized in table 1.

TABLE 1

Addition of hyperbranched polymer to acrylate dispersion 1:

| | Pendulum hardness | | |
|---|---|---|---|
| Acrylate dispersion I | 3 h | 8 h | 24 h |
| + oxidatively crosslinkable hyperbranched polymer from ex. 2 | 21 | 21 | 21 |
| +oxidatively crosslinkable hyperbranched polymer from ex. 3 | 21 | 21 | 20 |
| +oxidatively crosslinkable hyperbranched polymer from ex. 4 | 21 | 22 | 21 |
| +non-oxidatively crosslinkable hyperbranched polymer from ex. 1 (comparative) | 12 | 13 | 11 |
| +Boltorn U3000 (comparative)*) | 8 | 12 | 12 |

*)Commercial, fatty-acid-modified, dendritic polymer with unsaturated groups, molecular weight 6500 g/mol (Perstorp AB)

It is seen that, when oxidatively crosslinkable hyperbranched polymers are added, the development of hardness is more rapid and the ultimate hardness achieved is higher.

2. Preparation of Aqueous Paints

The individual components (for manufacturer details see table 2) were metered out in the quantity (parts by weight) and sequence as shown in table 3, with stirring using a toothed disk stirrer. After the titanium dioxide pigment had been added, the speed was increased to 2000 rpm and dispersion took place until the pigment paste was smooth, i.e., free of lumps. Then, if necessary, the paste was cooled to room temperature and the remaining components were added at a reduced speed.

TABLE 2

| Function | Name | Manufacturer |
|---|---|---|
| Dispersant | Disperbyk ® 190 (high molecular mass block copolymer with pigment-active groups) | Byk-Chemie GmbH, Wesel |
| Defoamer | Byk ® 020 (polysiloxane) | Byk-Chemie GmbH, Wesel |
|  | Tego Airex ® 902W (silica-containing poly(ethersiloxane) copolymer) | Tego Chemie, Essen |
| Titanium dioxide pigment | Kronos ® 2190 | Kronos Titan GmbH, Leverkusen |
| Thickeners | DSX 2000 and DSX 1514 (polyurethane-based associative thickeners) | Cognis Deutschland GmbH & Co. KG, Düsseldorf |

TABLE 3

Formulation of the pigment paste

| Component | Name | Amount [g] |
|---|---|---|
| Water |  | 53.6 |
| Defoamer | Byk ® 020 | 4.8 |
| Dispersant | Disperbyk ® 190 | 23.6 |
| Thickener | DSX 2000/1514 (1:0.3) | 12.3 |
| Titanium dioxide pigment | Kronos ® 2190 | 235.8 |

TABLE 4

Composition of the paint

| Component | Name | Amount [g] |
|---|---|---|
| Pigment paste from table 3 |  | 355.1 |
| Water |  | 26.3 |
| Solvent | Propylene glycol | 21.8 |
| Binder | Aqueous acrylate dispersion from inventive example 5 + optionally admixed oxidatively cross-linkable hyperbranched polymers (see table 5) | 621.9 |

3. Testing of Aqueous Paints (Coating Compositions)

TABLE 5

|  | Pendulum hardness | | | |
|---|---|---|---|---|
| Paint based on acrylate dispersion I | 3 h | 8 h | 24 h | 72 h |
| Without addition (comparative) | 7 | 8 | 12 | 17 |
| +non-oxidatively crosslinkable hyperbranched polymer from ex. 1 (comparative) | 7 | 8 | 12 | 13 |

TABLE 5-continued

|  | Pendulum hardness | | | |
|---|---|---|---|---|
| Paint based on acrylate dispersion I | 3 h | 8 h | 24 h | 72 h |
| +oxidatively crosslinkable hyperbranched polymer from ex. 2 | 8 | 10 | 17 | 27 |
| +oxidatively crosslinkable hyperbranched polymer from ex. 4 | 28 | 30 | 31 | 31 |

Paints with/without Siccative:

TABLE 6

|  | Pendulum hardness | | | |
|---|---|---|---|---|
| Paint based on acrylate dispersion I | 3 h | 7 h | 24 h | 72 h |
| +oxidatively crosslinkable hyperbranched polymer from ex. 5 | 10 | 10 | 21 | 18 |
| +oxidatively crosslinkable hyperbranched polymer from ex. 5 + 0.03 Nuodex Cobalt 10 | 10 | 13 | 17 | 26 |
| +oxidatively crosslinkable hyperbranched polymer from ex. 2 | 11 | 11 | 20 | 21 |
| +oxidatively crosslinkable hyperbranched polymer from ex. 2 + 0.03 Nuodex Cobalt 10 | 11 | 13 | 17 | 28 |

By adding siccatives it is possible to obtain an additional increase in ultimate hardness.

The invention claimed is:

1. An aqueous polymer dispersion, comprising:
   an emulsion polymer of an α,β-ethylenically unsaturated monomer; and
   a highly branched polycarbonate comprising a $C_8$ to $C_{32}$ alkenyl radical comprising a carbon-carbon double bond.

2. The polymer dispersion according to claim 1, wherein the highly branched polycarbonate comprises a $C_8$ to $C_{32}$ alkenyl radical comprising at least two carbon-carbon double bonds.

3. An aqueous polymer dispersion, comprising:
   an emulsion polymer of an α,β-ethylenically unsaturated monomer; and
   a highly branched polycarbonate comprising a $C_8$ to $C_{32}$ alkenyl radical comprising a carbon-carbon double bond,
   wherein the $C_8$ to $C_{32}$ alkenyl radical comprises at least two isolated carbon-carbon double bonds.

4. An aqueous polymer dispersion, comprising:
   an emulsion polymer of an α,β-ethylenically unsaturated monomer; and
   a highly branched polycarbonate comprising a $C_8$ to $C_{32}$ alkenyl radical comprising a carbon-carbon double bond,
   wherein the $C_8$ to $C_{32}$ alkenyl radical comprises carbon-carbon double bonds in the 1,4-position or in the 1,4,7-position relative to one another.

5. The polymer dispersion according to claim 3, further comprising a $C_8$ to $C_{32}$ alkenyl radical comprising at least two conjugated carbon-carbon double bonds.

6. The polymer dispersion according to claim 1, obtained by a process comprising reacting an organic carbonate (A) with an at least trifunctional alcohol (B) and a compound (C) comprising:
   a $C_8$ to $C_{32}$ alkenyl radical having a carbon-carbon double bond, and
   a functional group that is reactive toward a hydroxyl group or a carbonate group, to form the highly branched polycarbonate.

7. The polymer dispersion according to claim 1, comprising a highly branched polycarbonate having a degree of branching of 10% to 95%.

8. The polymer dispersion according to claim 1, wherein the α,β-ethylenically unsaturated monomer is an ester of an α,β-ethylenically unsaturated monocarboxylic or dicarboxylic acid with a $C_1$-$C_{20}$ alkanol, a vinylaromatic, an ester of a vinyl alcohol with a $C_1$-$C_{30}$ monocarboxylic acid, an ethylenically unsaturated nitrile, a vinyl halide, a vinylidene halide, a monoethylenically unsaturated carboxylic or sulfonic acid, a phosphorus monomer, an ester of an α,β-ethylenically unsaturated monocarboxylic or dicarboxylic acid with a $C_2$-$C_{30}$ alkanediol, an amide of an α,β-ethylenically unsaturated monocarboxylic or dicarboxylic acid with a $C_2$-$C_{30}$ amino alcohol which comprises a primary or secondary amino group, a primary amide of an α,β-ethylenically unsaturated monocarboxylic acid or its N-alkyl and N,N-dialkyl derivative, a N-vinyllactam, an open-chain N-vinylamide compound, an ester of an allyl alcohol with a $C_1$-$C_{30}$ monocarboxylic acid, an ester of an α,β-ethylenically unsaturated monocarboxylic or dicarboxylic acid with an amino alcohol, an amide of an α,β-ethylenically unsaturated monocarboxylic or dicarboxylic acid with a diamine which comprises a primary or secondary amino group, a N,N-diallylamine, a N,N-diallyl-N-alkylamine, a vinyl- or allyl-substituted nitrogen heterocycle, a vinyl ether, a $C_2$-$C_8$ monoolefin, a nonaromatic hydrocarbon comprising at least two conjugated double bonds, a polyether (meth)acrylate, a monomer comprising a urea group, a vinyl monomer comprising a crosslinking group, or any mixture thereof.

9. The polymer dispersion according to claim 1, wherein the emulsion polymer comprises, based on a total weight of the monomers, at least 40% by weight of an ester of an α,β-ethylenically unsaturated monocarboxylic or dicarboxylic acid with a $C_1$-$C_{20}$ alkanol, a vinylaromatic, an ester of a vinyl alcohol with a $C_1$-$C_{30}$ monocarboxylic acid, an ethylenically unsaturated nitrile, a vinyl halide, a vinylidene halide, or any mixture thereof.

10. The polymer dispersion according to claim 9, wherein the emulsion polymer further comprises, based on a total weight of the monomers, from 40% to 60% by weight of an ethylenically unsaturated monocarboxylic or dicarboxylic acid, an anhydride, a monoester of an ethylenically unsaturated dicarboxylic acid, a (meth)acrylamide, a $C_1$-$C_{10}$ hydroxyalkyl (meth)acrylate, a $C_1$-$C_{10}$ hydroxyalkyl (meth)acrylamide, a polyether (meth)acrylate, a monomer comprising a urea group, an aceto-acetoxyalkyl (meth)acrylate, an acetoacetoxyalkyl (meth)acrylamide, or any mixture thereof.

11. A coating material, comprising:
the aqueous polymer dispersion of claim 1;
optionally a pigment;
optionally a filler and
optionally further auxiliaries, and water.

12. The coating material according to claim 11, wherein the coating material is a clear varnish.

13. The coating material according to claim 11, wherein the coating material is an emulsion paint.

14. A process for preparing the aqueous polymer dispersion of claim 1, the process comprising free-radical emulsion polymerizing the α,β-ethylenically unsaturated monomer, such that highly branched polycarbonate is added before the emulsion polymerization, during the emulsion polymerization, after the emulsion polymerization or any combination thereof.

15. The polymer dispersion according to claim 6, wherein the processes comprises:
a) reacting the organic carbonate (A) with the at least trifunctional alcohol (B), with elimination of an alcohol to obtain a condensation product (K); and
b) further reacting the condensation product (K), with elimination of an alcohol to obtain the highly branched polycarbonate, such that at least part of eliminated alcohols are removed from the reaction mixture,
wherein either the reacting step b) of the condensation product (K) comprises reacting with the compound (C), or the process further comprises reacting the highly branched polycarbonate with the compound (C).

16. The polymer dispersion according to claim 15, wherein the highly branched polycarbonate comprises at least 4 hydroxyl groups per molecule.

17. The polymer dispersion according to claim 6, wherein the compound (C) is a palmitoleic acid, an oleic acid, a linoleic acid, a linolenic acid, an eleostearic acid, a fatty acid from linseed oil, a fatty acid from soybean oil, a fatty acid from cottonseed oil, a fatty acid from sunflower oil, a fatty acid from safflower oil, a fatty acid from castor oil, a fatty acid from fish oil, a fatty acid from coconut fat, a fatty acid from palm kernel oil, a fatty acid from rapeseed oil, a fatty acid from oiticica oil, a fatty acid from tung oil, a fatty acid from ricinene oil, a fatty acid from tall oil, a fatty acid from poppy oil, a fatty acid from nut oil, a fatty acid from hemp oil, or any derivative or mixture thereof.

* * * * *